(12) United States Patent
Bober et al.

(10) Patent No.: US 11,689,068 B2
(45) Date of Patent: **\*Jun. 27, 2023**

(54) MOUNTABLE CHARGER SHELF FOR CHARGING A PORTABLE ELECTRONIC DEVICE

(71) Applicant: WBTEC, LLC, Sarasota, FL (US)

(72) Inventors: Wieslaw Bober, Hopewell Junction, NY (US); Kamil Sienkiel, Wegrzce (PL); Dominik Stanislaw Sienkiel, Ostrowiec Swietokrzyski (PL)

(73) Assignee: WBTEC, LLC, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,445

(22) Filed: Jun. 27, 2022

(65) Prior Publication Data

US 2022/0352766 A1 Nov. 3, 2022

Related U.S. Application Data

(63) Continuation-in-part of application No. 16/681,487, filed on Nov. 12, 2019, now Pat. No. 11,374,417.

(60) Provisional application No. 62/758,239, filed on Nov. 9, 2018.

(30) Foreign Application Priority Data

Jul. 16, 2021 (PL) .......................................... 438515

(51) Int. Cl.
| | | |
|---|---|---|
| *H01M 10/46* | (2006.01) | |
| *H02J 50/90* | (2016.01) | |
| *H02J 7/35* | (2006.01) | |
| *H02J 7/00* | (2006.01) | |
| *H02J 50/10* | (2016.01) | |

(52) U.S. Cl.
CPC ............ *H02J 50/90* (2016.02); *H02J 7/0044* (2013.01); *H02J 7/35* (2013.01); *H02J 50/10* (2016.02)

(58) Field of Classification Search
CPC .......... H02J 7/0042; H02J 7/0044; H02J 7/35; H02J 50/90; H02J 50/10; H02J 50/005
USPC ........ 320/101, 107, 108, 114, 115, 132, 148
See application file for complete search history.

(56) References Cited

U.S. PATENT DOCUMENTS

| | | |
|---|---|---|
| 2009/0295327 A1 | 12/2009 | McGinley |
| 2017/0149181 A1 | 5/2017 | Nelson |
| 2018/0191178 A1 | 7/2018 | Byrne |
| 2019/0305577 A1 | 10/2019 | Yi |

FOREIGN PATENT DOCUMENTS

| | | | | |
|---|---|---|---|---|
| CN | 110212616 A | * | 9/2019 | ............. B60R 16/03 |
| FR | 3059485 A1 | * | 6/2018 | ............. B60R 16/03 |

* cited by examiner

*Primary Examiner* — Edward Tso
(74) *Attorney, Agent, or Firm* — The Farrell Law Firm, P.C.

(57) ABSTRACT

A charger shelf for wireless charging a portable electronic device located thereon is provided. The charger shelf includes a shelf mounted on a holder and configured to move in a direction of at least one of an X, Y or Z axis from a rest position to an optimal charging positional using an internal drive unit mounted in the shelf, and a charging module connected to an electrical power source and positioned inside the shelf and equipped with at least one coil supplying power to the portable electronic device, the charging module determining an area configured to charge the portable electronic device.

19 Claims, 33 Drawing Sheets

MOUNTABLE CHARGER SHELF FOR CHARGING A PORTABLE ELECTRONIC DEVICE

PRIORITY

This application claims priority under 35 U.S.C. § 119 to Polish Patent Application No. 438,515, filed in the Polish Patent Office on Jul. 16, 2021, and is a Continuation in Part Application of U.S. application Ser. No. 16/681,487, filed in the U.S. Patent and Trademark Office on Nov. 12, 2019, which claims priority under 35 U.S.C. § 119 to Provisional Application No. 62/758,239, filed in the U.S. Patent and Trademark Office on Nov. 9, 2018, the entire content of each of which are incorporated herein by reference in their entireties.

BACKGROUND OF THE DISCLOSURE

1. Field of the Disclosure

The present disclosure relates generally to charging electronic devices.

2. Description of the Related Art

Due to the increasing use of electronic devices (i.e., mobile phones, tablets, and personal computers (PCs)), more and more charging locations are needed. Recently, many electronic devices are capable of wired or wireless charging, however, convenient charging locations may not exist.

Users of electronic devices frequently use their electronic devices while sitting on or around furniture (i.e., sofas). Thus, there is a need for charging locations to be situated on or around furniture, and not simply at a desk or table.

Therefore, there is a need to place a charger on or around a piece of furniture that can be characterized by various forms or different sizes. If the user is not interested in obtaining a piece of furniture with a charger built into it, it may be necessary to use a separate device for charging.

Further, wireless charging is increasing in popularity. Wireless charging is beneficial to users due to convenience. Users can place their electronic device in a wireless charging zone to start charging the device without plugging it, as in the case of wall chargers and other traditional charging devices. However, ordinarily a wireless charging induction coil is stationary. Therefore, wireless chargers may be limited since they require the electronic device to be placed in a specific area for charging. Frequently, the charging area is small and a user must be careful when placing the electronic device in the appropriate charging area.

In addition, traditional chargers may be plugged into wall outlets, and the charging locations are limited by the length of the charging cable extending out from the wall outlet.

Thus, there is a need to manufacture more convenient charging devices that are adaptable to various locations, and can change positions to a resting position when not in use.

SUMMARY

The present disclosure has been made to address the above-mentioned problems and disadvantages, and to provide at least the advantages described below.

According to an aspect of the disclosure, a charger shelf for wireless charging a portable electronic device located thereon, the charger shelf including a shelf mounted on a holder and configured to move in a direction of at least one of an X, Y or Z axis from a rest position to an optimal charging positional using an internal drive unit mounted in the shelf, and a charging module connected to an electrical power source and positioned inside the shelf and equipped with at least one coil supplying power to the portable electronic device, the charging module determining an area configured to charge the portable electronic device.

According to another aspect of the disclosure, a charger shelf for wireless charging a portable electronic device located thereon, the charger shelf includes a shelf mounted on a holder and configured to move in a direction of at least one of an X, Y or Z axis from a rest position to an optimal charging positional using a first motor mounted in the shelf, a charging module connected to an electrical power source and positioned inside the shelf and equipped with a second motor and at least one coil supplying power to the portable electronic device, the charging module determining an area configured to charge the portable electronic device; and a position sensor matrix configured to recognize a position of the external electronic device on a surface of the charger shelf based on modulation of current drawn by the portable electronic device, wherein the charger shelf is configured to visually display or audibly indicate at least one direction for identifying an optimal charging position for charging the portable electronic device based on the recognized position, and wherein the charging module is configured to move from a first position to a second position using the second motor.

BRIEF DESCRIPTION OF THE DRAWINGS

Aspects, features and advantages of the present disclosure will become more apparent from the following detailed description when taken in conjunction with the accompanying drawings in which.

DETAILED DESCRIPTION

Figure 1:
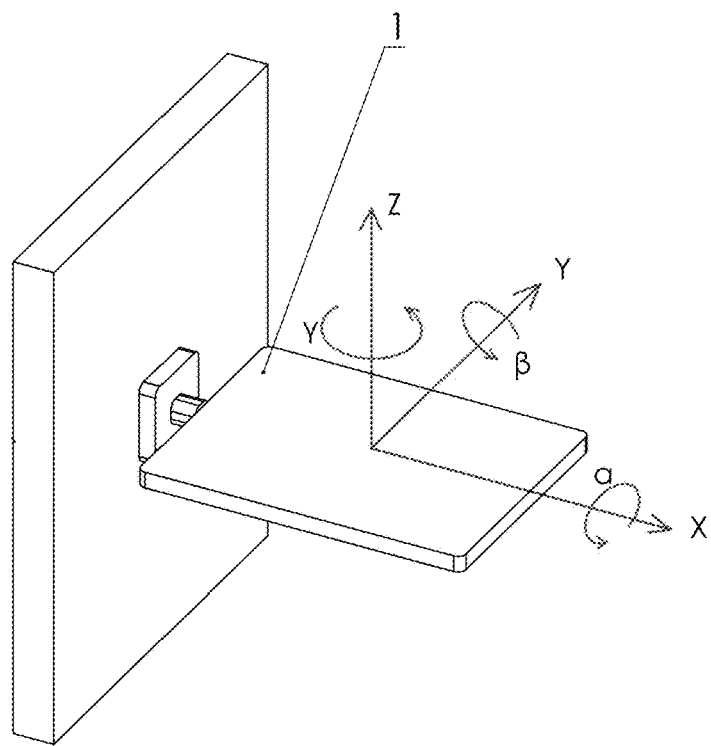
FIG. 1 shows a diagram illustrating a top perspective view of a charger shelf movable along X, Y, and Z axes, according to an embodiment of the present disclosure.

The present disclosure is directed to providing a charging device for an electronic device and is described in detail with reference to the accompanying drawings. Detailed descriptions of constructions or processes known in the art may be omitted to avoid obscuring the subject matter of the present disclosure.

The descriptions of similar elements are omitted when those elements have already been described with respect to a previous figure.

The present disclosure provides a wireless charging device that may be detachably mounted in various rooms of, for example, a house, vehicle, airplane, or boat, and/or on any piece of furniture. The wireless charging device may be an intelligent device, with automatic detection of the position of a device to be charged and movement of an inductive coil towards the device to be charged.

Further, the present disclosure provides a charger that may be mounted on a bracket-member that attaches to a wall of a room, vehicle, or a piece of furniture. The charger (also referred to as "charging module") may include at least one coil for supplying power to an electronic device, and have a designated area on a surface of the charger in which charging may occur. Additionally, the charger may be connected to a power source for charging.

Additionally, the charger may include a shelf and can be configured to move along or within at least one plane of the shelf, from a resting position to an optimal charging position. The expression "charger shelf" may refer to the charger and the shelf.

The charger can be moved along, at least, one axis from among X, Y, and/or Z axes corresponding to multiple planes. For example, the charger can be moved from a rest position to an optimal charging position. Further, the charger can rotate around each axis by an angle $\alpha$, $\beta$, or $\gamma$. Accordingly, a shelf may be equipped with an internal drive unit to move and rotate the charger and/or shelf.

The shelf may be configured to search for an electronic device to be charged that is located on a surface of the shelf. The shelf may include at least one power coil movable on the shelf plane, and provided with a locator that adjusts the position of the power coil to the position of the electronic device to be charged. For example, the power coil may be adjusted vertically (e.g., towards or away from the electronic device to be charged) or along a plane that is parallel to the surface on which the electronic device to be charged is located.

Accordingly, an induction coil may be displaced (moved) to a charging area where an induction process (e.g., wireless charging) may occur. A locator may include a base, a first motor place on the base, a base unit embedded in the base containing the wireless charging coil and a second motor.

The second motor may be configured to move the coil that is attached to a base unit (also referred to as the "coil base unit") from a first position to a second position. The first motor may be configured to move the coil base unit in a first direction, and the second motor may be configured to move the coil base unit in a second direction. The first direction may be perpendicular to the second direction.

The charger can have many variants. For example, the charger can be a shelf that is raised and lowered as a hinged pivot member mounted on a hinge handle, with the charging area located at any angle between a horizontal or vertical position.

Additionally, the charger can be a shelf rotatable around a vertical axis by a desired angle, fixed on a rotary handle. Further, the charger can be a shelf rising and falling vertically along a guide holder. In addition, the charger can be a shelf simultaneously movable in three dimensions on a hinged handle. Also, the charger can be a shelf pulling out and sliding in as a drawer along parallel guides. Additionally, the charger can be a shelf fixed in a magnetic holder.

The shelf may be equipped with a clamp for mounting mobile devices.

The charger may be powered by the mains, a battery, a rechargeable battery or a solar cell.

A device to be charged may be a smartphone, smartwatch or computer. The shelf may also be a display monitor. A device to be charged may be any electronic or electrical device equipped with a power receiver cooperating with the coil to supply the device with the electric current. The shelf of the charger can also be a heating station using radiation energy for heating.

The charger can also include a ventilating, humidifying or air-conditioning device that is mountable on the shelf.

The shelf of the charger can be equipped with a perimeter illumination, downwardly directed illumination, upwardly directed illumination, downwardly and upwardly directed illumination, or sideward directionally directed illumination along a periphery, with selectable illumination modes that allow a user to control the direction of the light output. The shelf can also be equipped with a motion sensor cooperating with the illumination.

An advantage of the solution is that the charger can be mounted on any support member, in any room and in any vehicle. The angle at which the charger is mounted, or a location of the charger may be selected freely by a user. The charger may simultaneously offer many additional functions, being a universal wireless charging station for any electronic or electrical device equipped with a receiver adapted to receive wireless power in the inductive charging area.

The charger may assume a shape of a separate shelf movable along, at least, one axis and within, at least, one plane from the rest position to the charging position, and may be provided with an attachment unit to the carrier in the form of a handle to enable such a movement.

Figure 2:
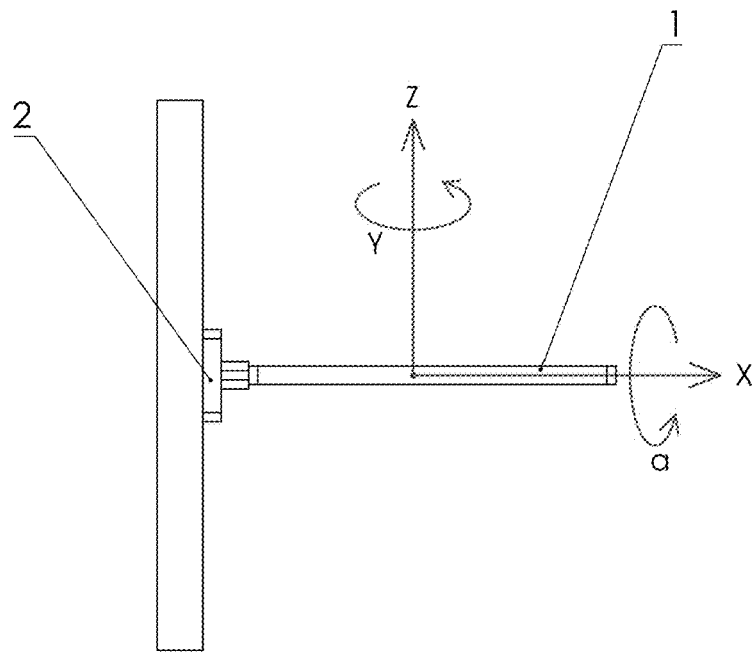
FIG. 2 shows a diagram illustrating a profile view of a charger shelf movable along X, Y, and Z axes showing angles or rotations α, β, and γ, respectively, according to an embodiment of the present disclosure.

FIG. 1 shows a diagram illustrating a top perspective view of a charger shelf movable along X, Y, and Z axes, according to an embodiment of the present disclosure. FIG. 2 shows a diagram illustrating a profile view of a charger shelf movable along X, Y, and Z axes showing angles or rotations α, β, or γ, respectively, according to an embodiment of the present disclosure.

Referring to FIGS. 1-2, the shelf 1 of the charger is attached to a holder 2 and can be moved along one or more of the axes X, Y, Z. Additionally, the shelf 1 can be rotated around each of the axes by an angle α, β, or γ, respectively.

Figure 3:
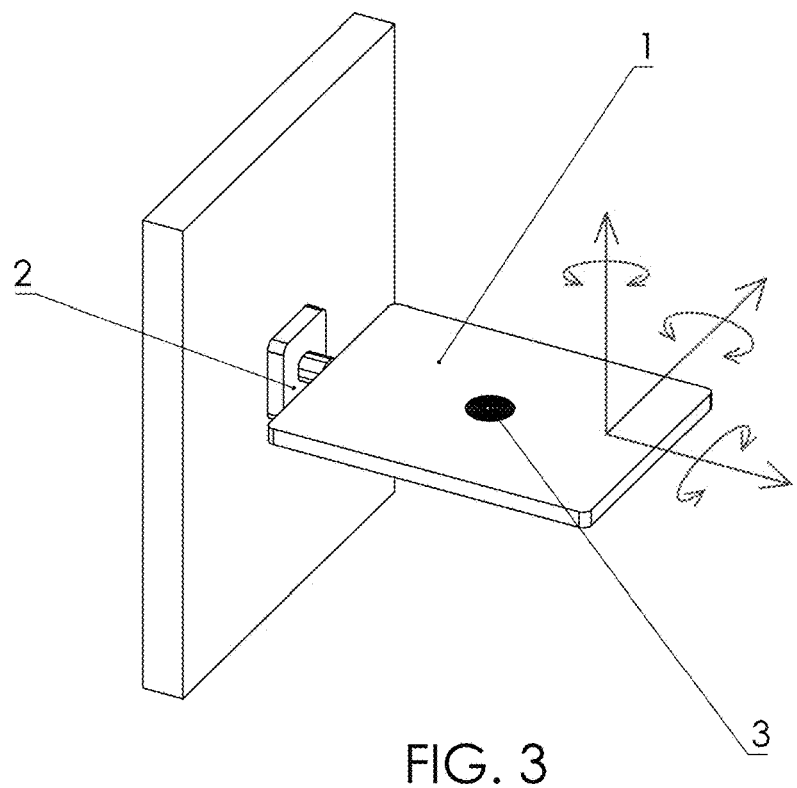
FIG. 3 shows a diagram illustrating a top perspective view of a charger shelf with a charging/energy transfer zone, according to an embodiment of the present disclosure.

FIG. 3 shows a diagram illustrating a top perspective view of a charger shelf with a charging/energy transfer zone, according to an embodiment of the present disclosure.

Referring to FIG. 3, the charger includes a shelf 1 mounted to a holder 2, enabling the charger to be displaced by bringing the charger from a rest position to a charging operating position and enabling linear and angular positioning of a charging area with respect to a mounting area of the charger. The charger may be mounted to a piece of furniture, a wall of a room, a wall of the interior of a car body, or a wall of a water vehicle or an air vehicle.

Figure 6:
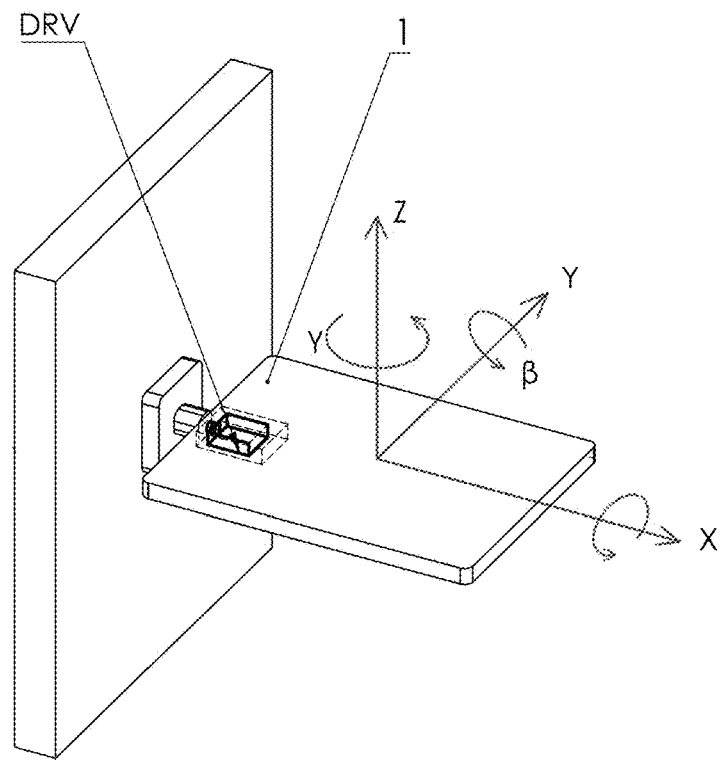
FIG. 6 shows a diagram illustrating a top perspective view of a charger shelf with an internal drive assembly, according to an embodiment of the present disclosure.

An internal drive unit DRV, shown in FIG. 6, may be used to displace or rotate the charger.

Figure 4:
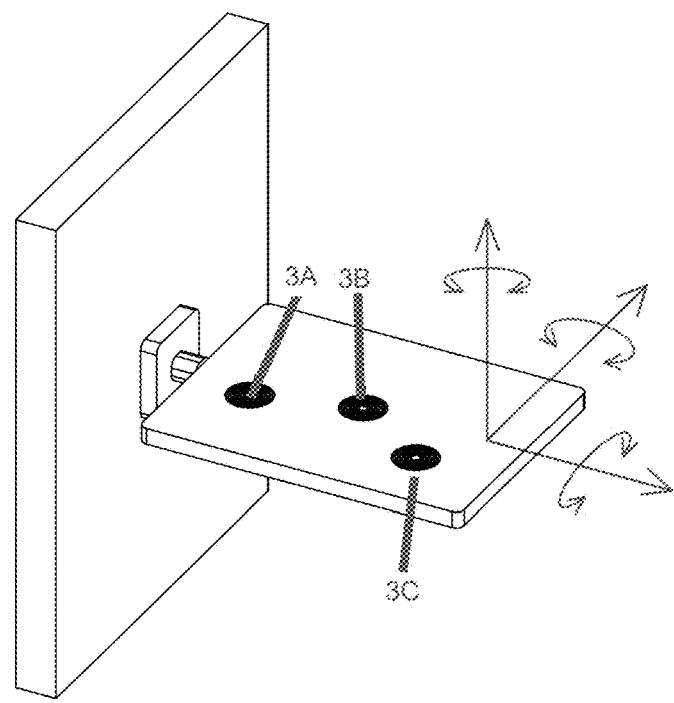
FIG. 4 shows a diagram illustrating a top perspective view of a charger shelf with multiple stationary charging/energy transfer zones, according to an embodiment of the present disclosure.

FIG. 4 shows a diagram illustrating a top perspective view of a charger shelf with multiple stationary charging/energy transfer zones, according to an embodiment of the present disclosure.

Referring to FIG. 4, several inductive coils 3A, 3B, and 3C are arranged in the shelf 1, so as to increase the area to charge electronic device by induction (the charging area).

Figure 5:
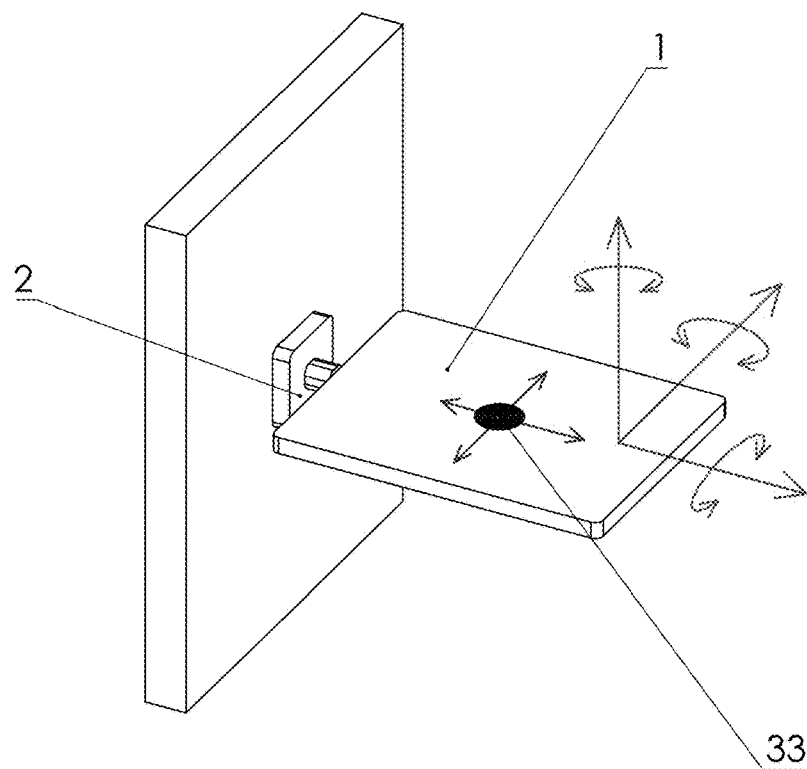
FIG. 5 shows a diagram illustrating a top perspective view of a charger shelf with a movable charging/energy transfer zone, according to an embodiment of the present disclosure.

FIG. 5 shows a diagram illustrating a top perspective view of a charger shelf with a movable charging/energy transfer zone, according to an embodiment of the present disclosure.

Referring to FIG. 5, a charger including an inductive coil 33 is located inside the shelf 1, movable along the two axes of the shelf 1. The induction coil 33 is movable, and thus may expand the charging area for charging a device. The induction coil may be positioned on a wireless base with a motor to move the wireless base and the induction coil along one or more of the axes.

FIG. 6 shows a diagram illustrating a top perspective view of a charger shelf with an internal drive assembly, according to an embodiment of the present disclosure.

Referring to FIG. 6, the shelf 1 is provided with an internal drive unit DRV. In such a case, the shelf 1 may be attached to the holder and configured to move in the direction of, at least, one axis among the X, Y, and Z axes and, at least, from a rest position (e.g., a vertical folded-down position) to an optimal charging position (e.g., a horizontal foldout-out position). In addition, the charger 1 may be rotated around the X, Y, and Z axes along angles α, β, or γ, respectively.

Figure 7:
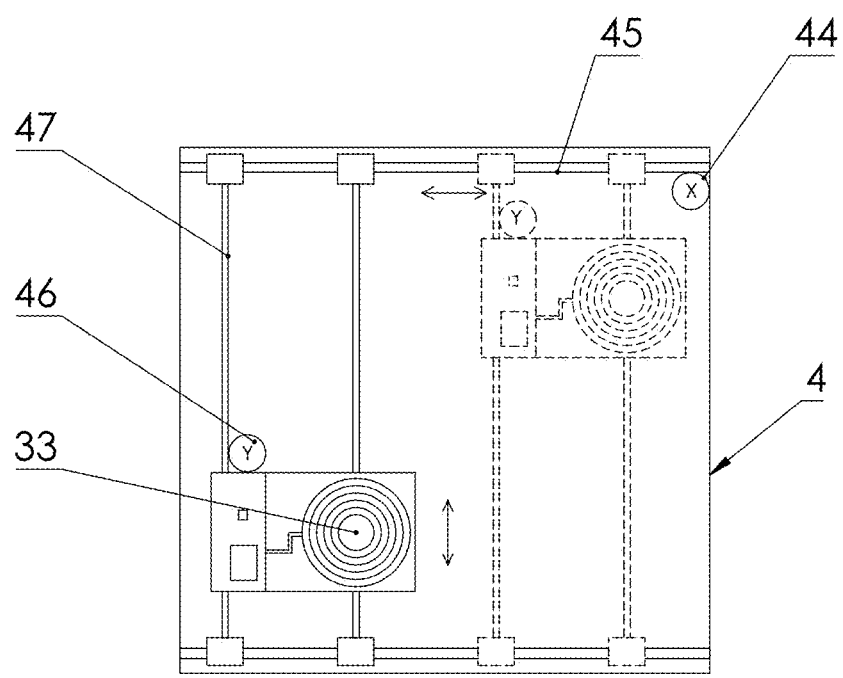
FIG. 7 shows a diagram illustrating a top view of a mobile coil module capable of locating an electronic device to be charged, according to an embodiment of the present disclosure.

FIG. 7 shows a diagram illustrating a top view of a mobile coil module capable of locating an electronic device to be charged, according to an embodiment of the present disclosure. The mobile coil module may be included in the shelf 1 to enable the charger to be move from a first position to a second position to charge a device.

Referring to FIG. 7, the base 4 may include the second motor 46 configured to move the coil base unit 33 from a first position to a second position, along a first guide 47, perpendicular to a second guide 45. The second motor 46 may be attached to the coil base unit or may be positioned somewhere else within the base 4 without being attached to the base unit of the coil 33. Additionally, the first motor 44 may be configured to move the base unit of the coil 33 in a first direction, and the second motor 46 may be configured to move the base unit of the coil 33 in a second direction, perpendicular to the first direction.

In addition, a power stage controller connected to the wireless charging coil may be configured to determine frequency characteristics of the wireless charging coil 33 and to control the power stage driver to provide a specific current to the wireless charging coil 33 based on the frequency characteristics of the coil and an input power value.

Thus, an electronic device may be intelligently searched for and located on the panel device 1 for charging. Accordingly, the induction coil 33 may be moved to redefine a charging zone (or charging area) to be within a predetermined distance of a device to be charged.

Figure 8:
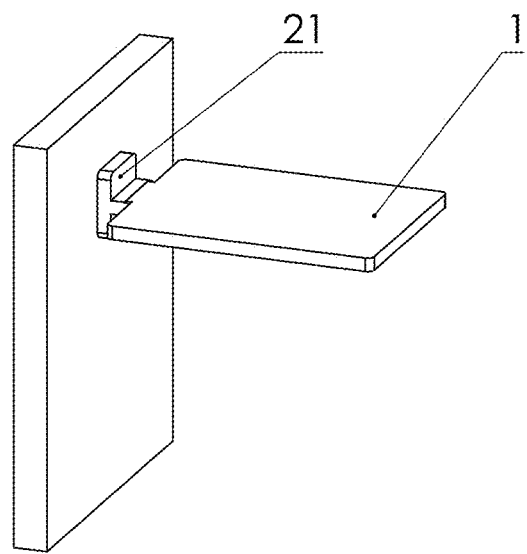
FIG. 8 shows a diagram illustrating a top perspective view of a charger shelf capable of tilting in an operating position, according to an embodiment of the present disclosure.

FIG. 8 shows a diagram illustrating a top perspective view of a charger shelf capable of tilting in an operating position, according to an embodiment of the present disclosure.

Referring to FIG. 8, a handle 21 of a shelf 1 is of a hinged form, and may include a locking device. The shelf 1 is in a horizontal position and may be locked in this position via the locking device of the handle 21.

Figure 9:
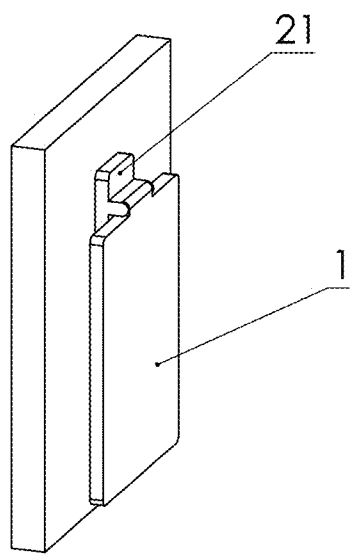
FIG. 9 shows a diagram illustrating a top perspective view of a charger shelf capable of tilting in a resting position, according to an embodiment of the present disclosure.

FIG. 9 shows a diagram illustrating a top perspective view of a charger shelf capable of tilting in a resting position, according to an embodiment of the present disclosure.

Referring to FIG. 9, the shelf 1 is in a vertical position and may be locked in this position via the locking device of the handle 21. The shelf 1 may be rotated 90 degrees from the vertical position to the horizontal position.

Figure 10:
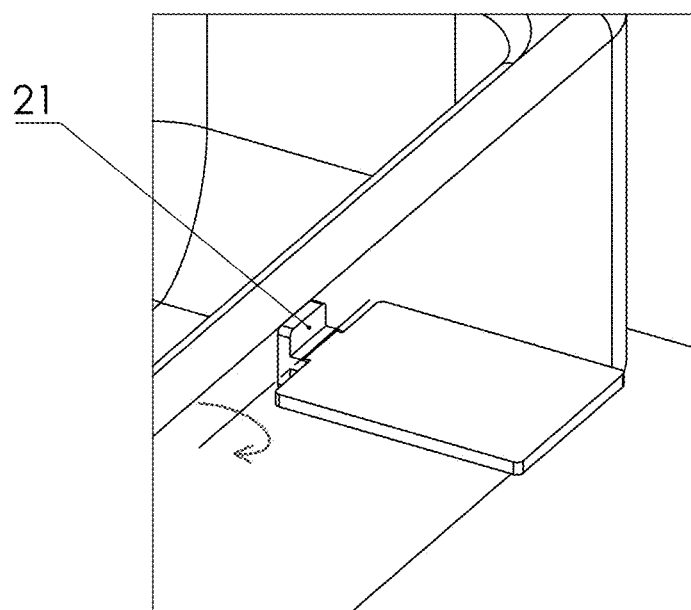
FIG. 10 shows a diagram illustrating a top perspective view of a charger shelf capable of tilting in an operating position, according to an embodiment of the present disclosure.
Figure 11:
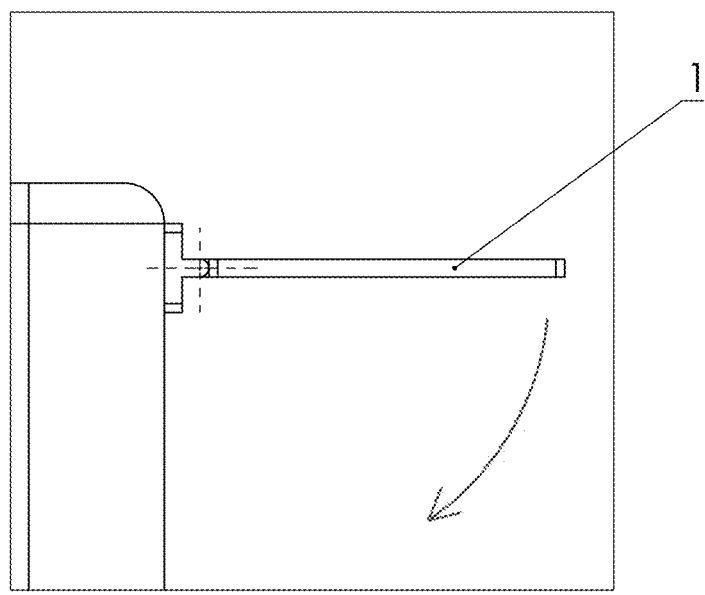
FIG. 11 shows a diagram illustrating a profile view of a charger shelf capable of tilting in an operating position, according to an embodiment of the present disclosure.

FIG. 10 shows a diagram illustrating a top perspective view of a charger shelf capable of tilting in an operating position, according to an embodiment of the present disclosure. FIG. 11 shows a diagram illustrating a profile view of a charger shelf capable of tilting in an operating position, according to an embodiment of the present disclosure.

Referring to FIGS. 10-11, the charger shelf is mounted via the handle 21 to a piece of furniture. The shelf 1 may be rotated from a horizontal position to a vertical position.

Figure 12:
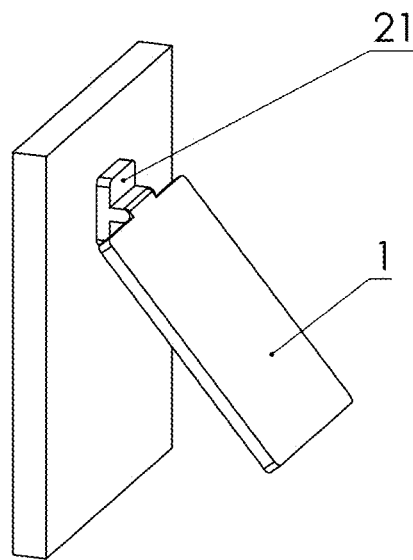
FIG. 12 shows a diagram illustrating a top perspective view of a charger shelf capable of tilting in an angled tilted position, according to an embodiment of the present disclosure.
Figure 13:
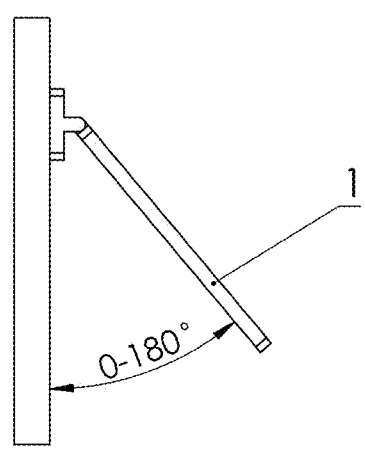
FIG. 13 shows a diagram illustrating a profile view of a charger shelf capable of tilting in an angled tilted position, according to an embodiment of the present disclosure.

FIG. 12 shows a diagram illustrating a top perspective view of a charger shelf capable of tilting in an angled tilted position, according to an embodiment of the present disclosure. FIG. 13 shows a diagram illustrating a profile view of a charger shelf capable of tilting in an angled tilted position, according to an embodiment of the present disclosure.

Figure 14:
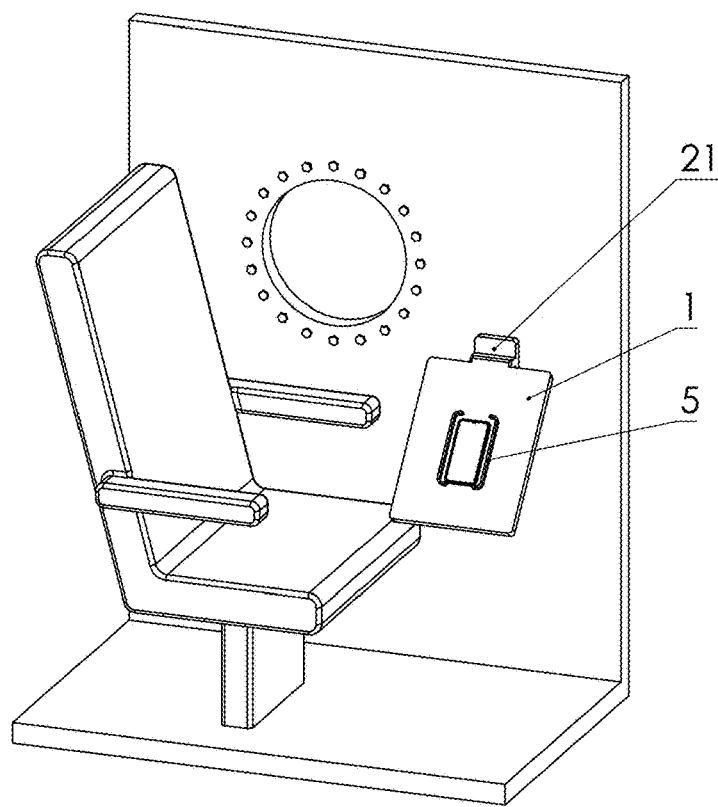
FIG. 14 shows a diagram illustrating a top perspective view of a charger shelf capable of tilting in an angled tilted position located next to a seat, according to an embodiment of the present disclosure.
Figure 15:
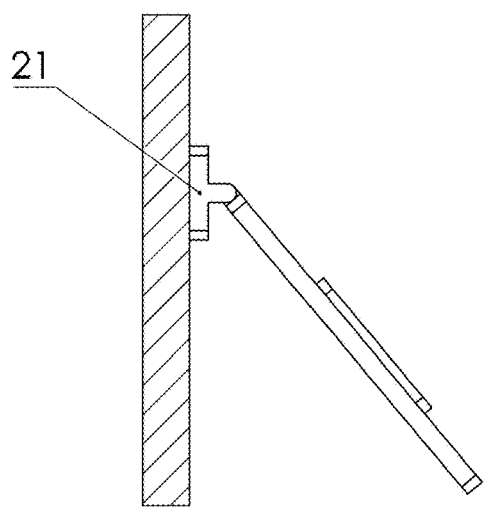
FIG. 15 shows a diagram illustrating a profile view of a charger shelf capable of tilting in an angled tilted position, according to an embodiment of the present disclosure.

Referring to FIGS. 12-13, the shelf 1 is shown in a tilted position. The shelf 1 may be moved to any position within a range of 0 degrees to 180 degrees. The shelf may be locked using the locking device of the handle 21 at any position within the range. FIG. 14 shows a diagram illustrating a top perspective view of a charger shelf capable of tilting in an angled tilted position located next to a seat, according to an embodiment of the present disclosure. FIG. 15 shows a diagram illustrating a profile view of a charger shelf capable of tilting in an angled tilted position, according to an embodiment of the present disclosure.

Referring to FIGS. 14-15, the shelf 1 is mounted to a wall next to a seat. The shelf 1 is in a tilted angular position. The shelf 1 includes a clamp 5 for holding an electronic device to be charged. The clamp 5 is particularly useful when the shelf 1 is in the tilted angular position, because it allows the electronic device to be held in a position for charging.

Figure 16:
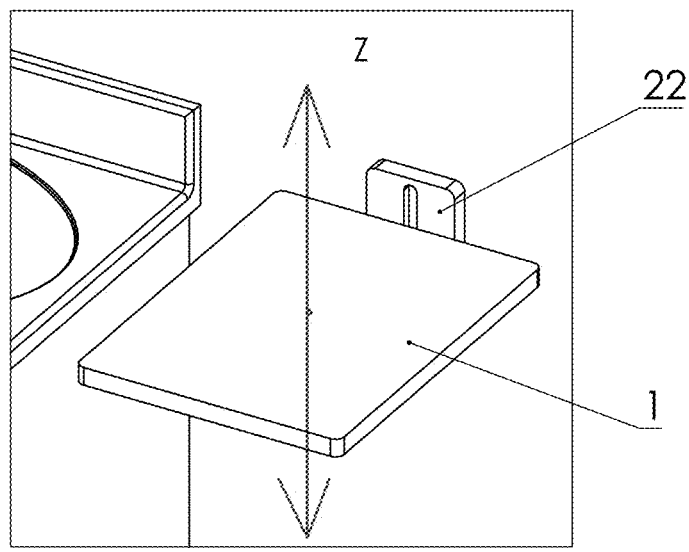
FIG. 16 shows a diagram illustrating a top perspective view of a charger shelf capable of moving vertically along a z axis, according to an embodiment of the present disclosure.
Figure 17:
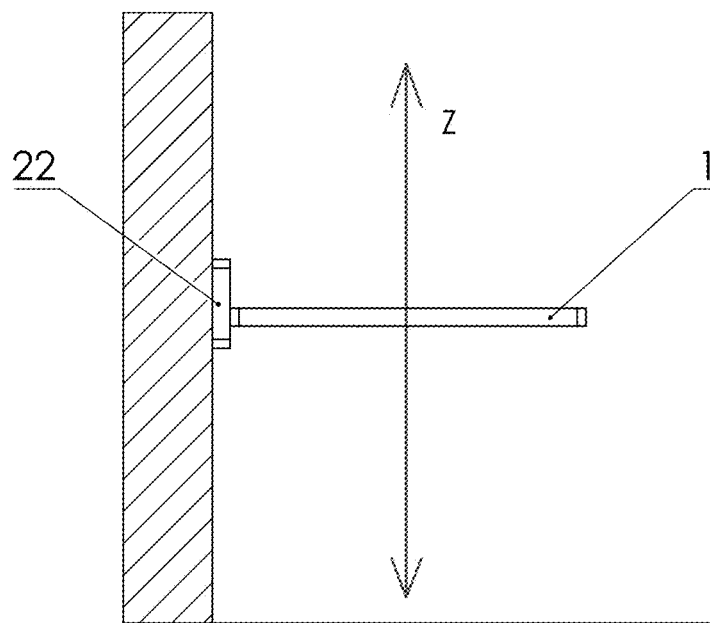
FIG. 17 shows a profile view of a charger shelf capable of moving vertically along a z axis, according to an embodiment of the present disclosure.

FIG. 16 shows a diagram illustrating a top perspective view of a charger shelf capable of moving vertically along a z axis, according to an embodiment of the present disclosure. FIG. 17 shows a profile view of a charger shelf capable of moving vertically along a z axis, according to an embodiment of the present disclosure.

Figure 18:
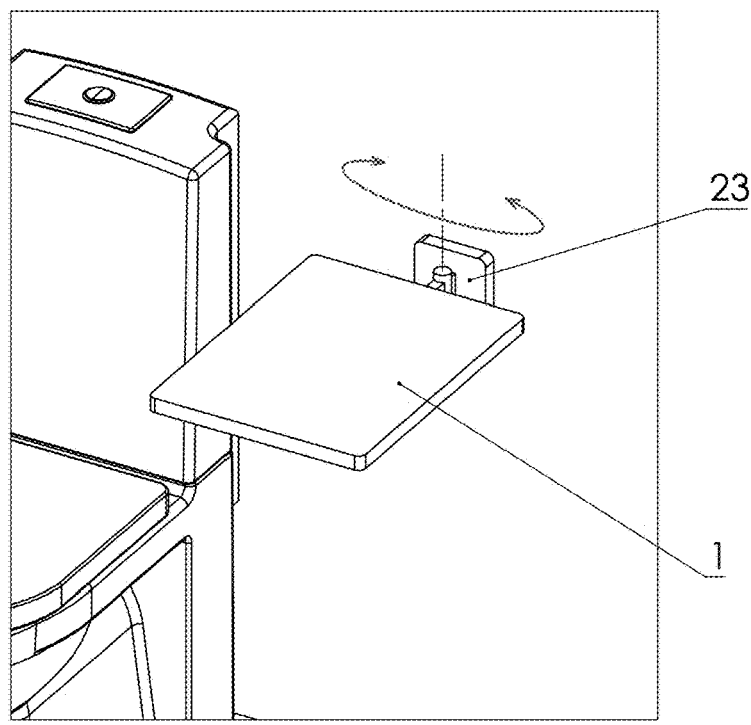
FIG. 18 shows a diagram illustrating a top perspective view of a charger shelf capable of rotating around a vertical axis, according to an embodiment of the present disclosure.
Figure 19:
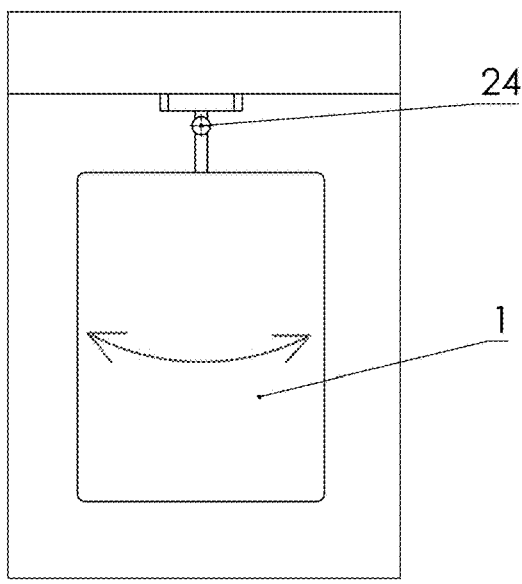
FIG. 19 shows a bird eye view of a charger shelf capable of rotating around a vertical axis, according to an embodiment of the present disclosure.

Referring to FIGS. 16-17, the shelf 1 is movable along a vertical axis Z to adjust a height of the shelf 1. The handle 22 may include a vertical guide with a locking device. The locking device may lock the shelf 1 at a particular height along the vertical axis Z. FIG. 18 shows a diagram illustrating a top perspective view of a charger shelf capable of rotating around a vertical axis, according to an embodiment of the present disclosure. FIG. 19 shows a bird eye view of a charger shelf capable of rotating around a vertical axis, according to an embodiment of the present disclosure.

Referring to FIGS. 18-19, the shelf 1 is rotatable around a vertical axis. A handle 23 includes a pin 24 for enabling the shelf 1 to rotate around the vertical axis.

Figure 20:
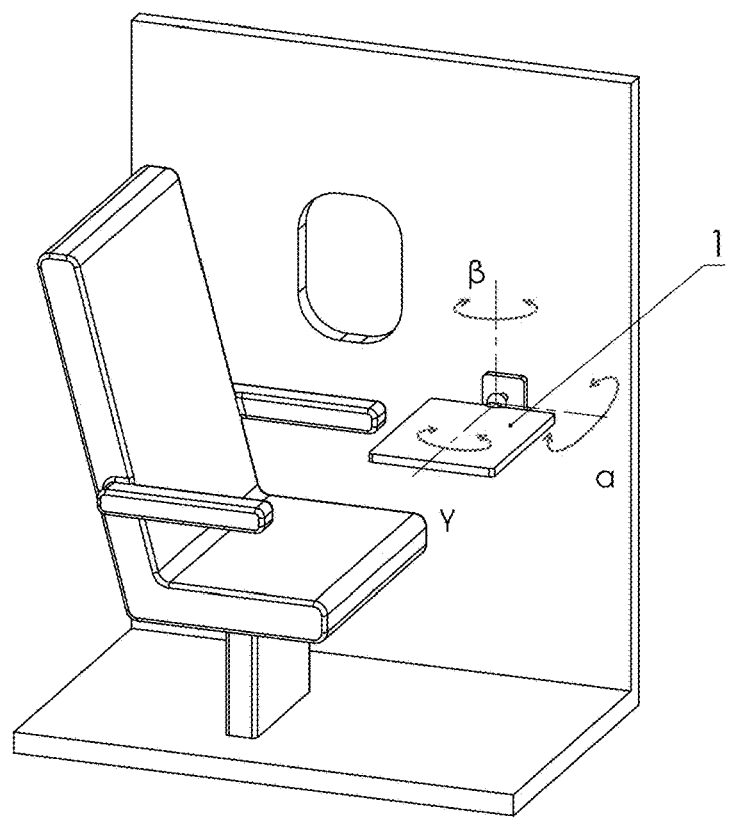
FIG. 20 shows a diagram illustrating a top perspective view of a charger shelf capable of rotating along 3 axes and positioned next to a seat, according to an embodiment of the present disclosure.
Figure 21:
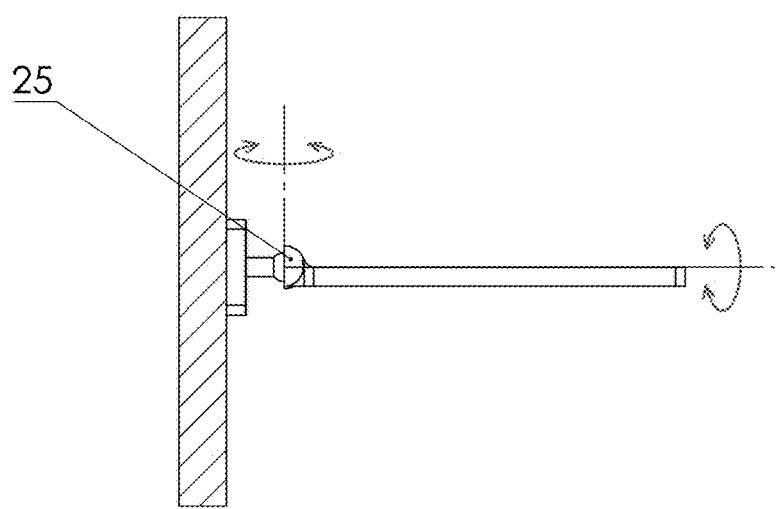
FIG. 21 shows a diagram illustrating a profile view of a charger shelf capable of rotating along a vertical axis and a horizontal axis, according to an embodiment of the present disclosure.

FIG. 20 shows a diagram illustrating a top perspective view of a charger shelf capable of rotating along 3 axes and positioned next to a seat, according to an embodiment of the present disclosure. FIG. 21 shows a diagram illustrating a profile view of a charger shelf capable of rotating along a vertical axis and a horizontal axis, according to an embodiment of the present disclosure.

Referring to FIGS. 20-21, the shelf 1 is rotatable around three axis at angles α, β, and γ. The handle may include a physical joint 25 (articulating handle) for enabling the shelf 1 to rotate around the three axis at angles α, β, or γ.

Figure 22:
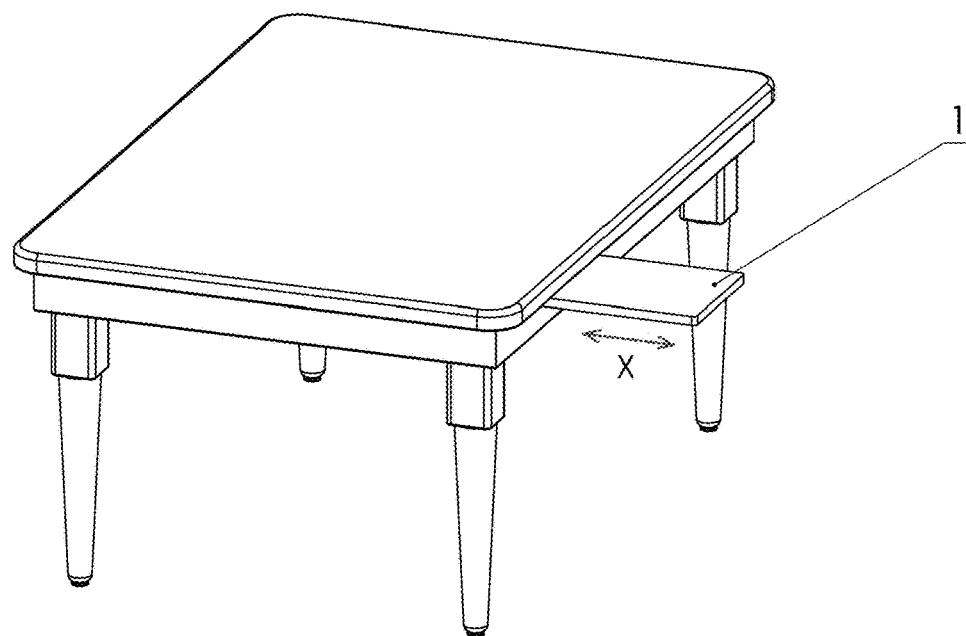
FIG. 22 shows a diagram illustrating a top perspective view of a charger shelf capable of sliding along an x axis, according to an embodiment of the present disclosure.
Figure 23:
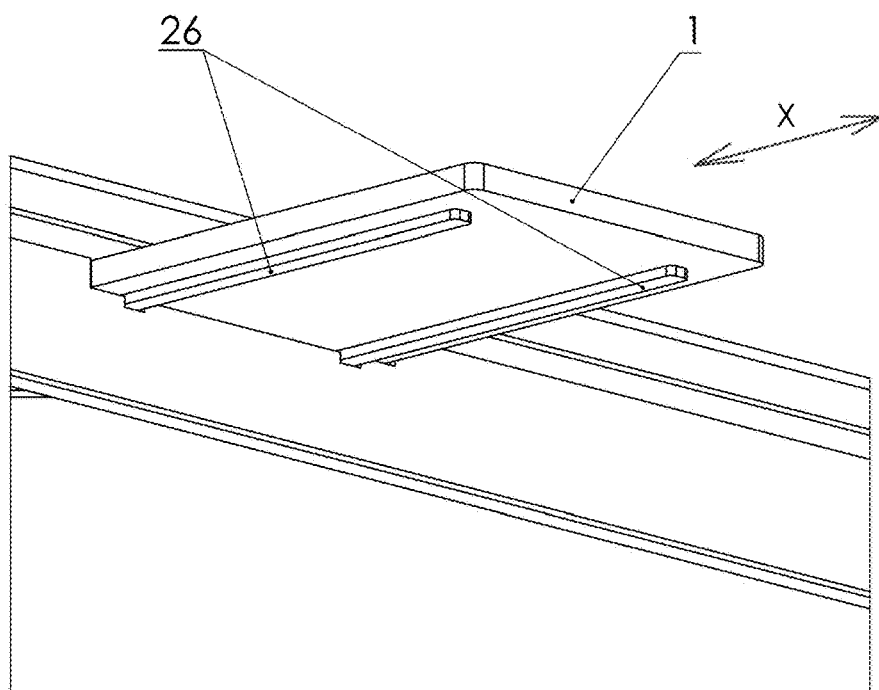
FIG. 23 shows a diagram illustrating a bottom perspective view of a charger shelf capable of sliding along an x axis, according to an embodiment of the present disclosure.

FIG. 22 shows a diagram illustrating a top perspective view of a charger shelf capable of sliding along an x axis, according to an embodiment of the present disclosure. FIG. 23 shows a diagram illustrating a bottom perspective view of a charger shelf capable of sliding along an x axis, according to an embodiment of the present disclosure.

Referring to FIGS. 22-23, the shelf 1 may be extended outwardly from a piece of furniture, a wall, or another object. The shelf 1 may act as a drawer and be movable into and out from the piece of furniture along an X axis. The bottom side of the shelf 1 includes guides 26 for allowing the shelf to extend outwardly or inwardly along a predefined path.

Figure 24:
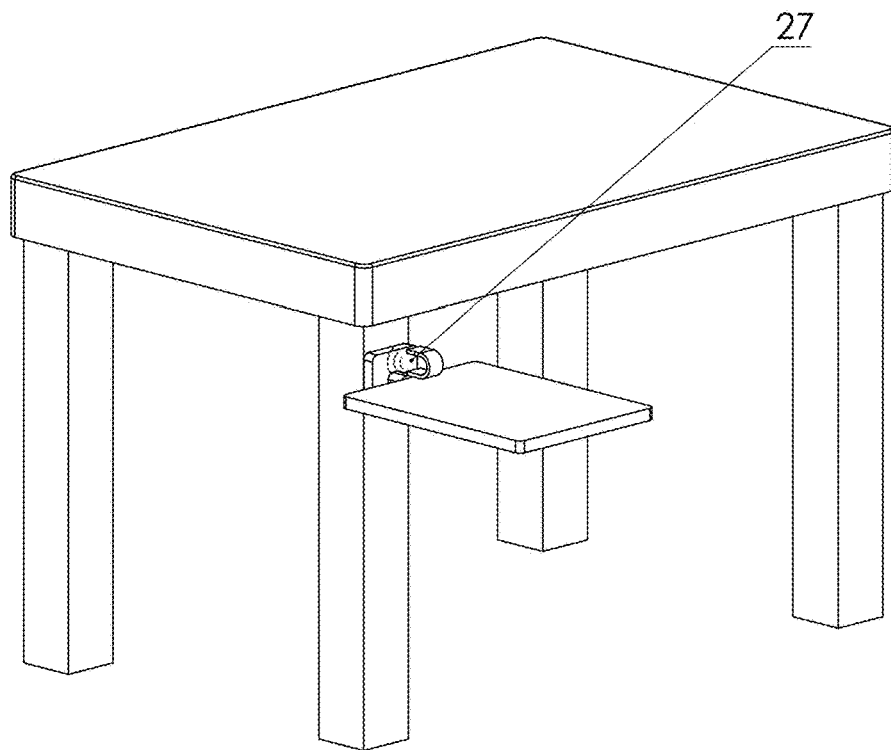
FIG. 24 shows a diagram illustrating a top perspective view of a charger shelf mounted with a magnetic holder, according to an embodiment of the present disclosure.
Figure 25:
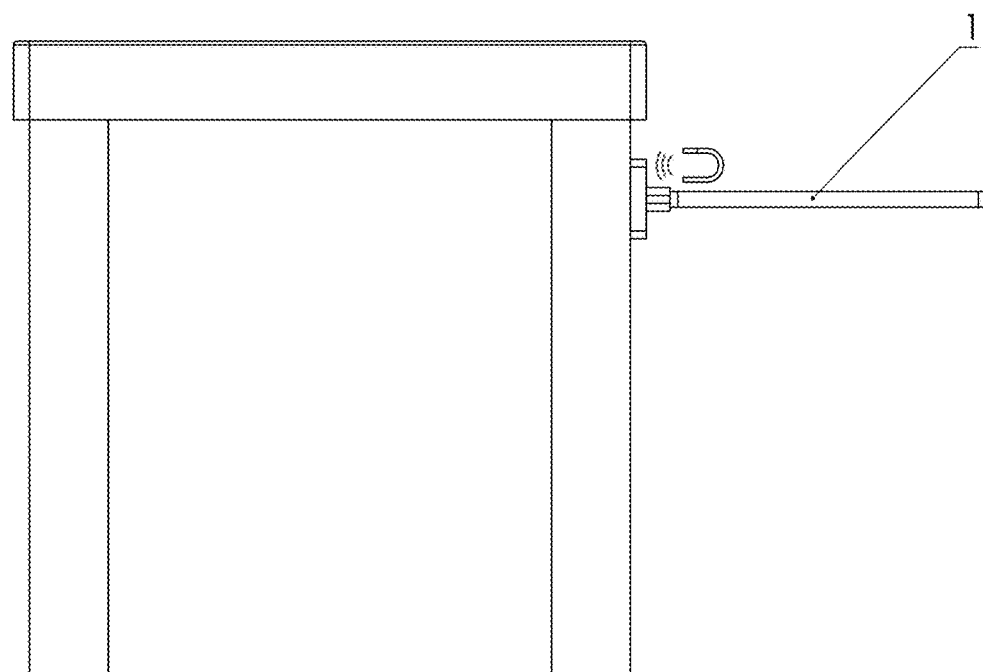
FIG. 25 shows a diagram illustrating a profile view of a charger shelf mounted with a magnetic holder, according to an embodiment of the present disclosure.

FIG. 24 shows a diagram illustrating a top perspective view of a charger shelf mounted with a magnetic holder, according to an embodiment of the present disclosure. FIG. 25 shows a diagram illustrating a profile view of a charger shelf mounted with a magnetic holder, according to an embodiment of the present disclosure.

Referring to FIGS. 24-25, the charger shelf is fastened to the furniture using a magnetic holder 27. The charger shelf can be mounted to a door frame, a desk leg, a chair leg, or a room structural element.

Figure 26:
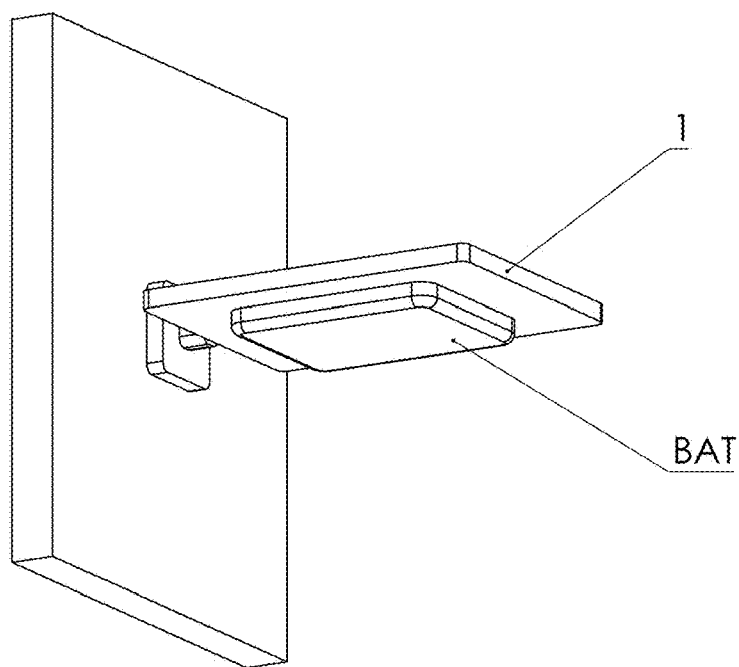
FIG. 26 shows a diagram illustrating a bottom perspective view of a charger shelf with a battery, according to an embodiment of the present disclosure.

FIG. 26 shows a diagram illustrating a bottom perspective view of a charger shelf with a battery, according to an embodiment of the present disclosure.

Referring to FIG. 26, the shelf 1 is equipped with its own power source in the form of a shelf-mounted battery BAT that may provide power to an induction coil for charging a device.

Figure 27:
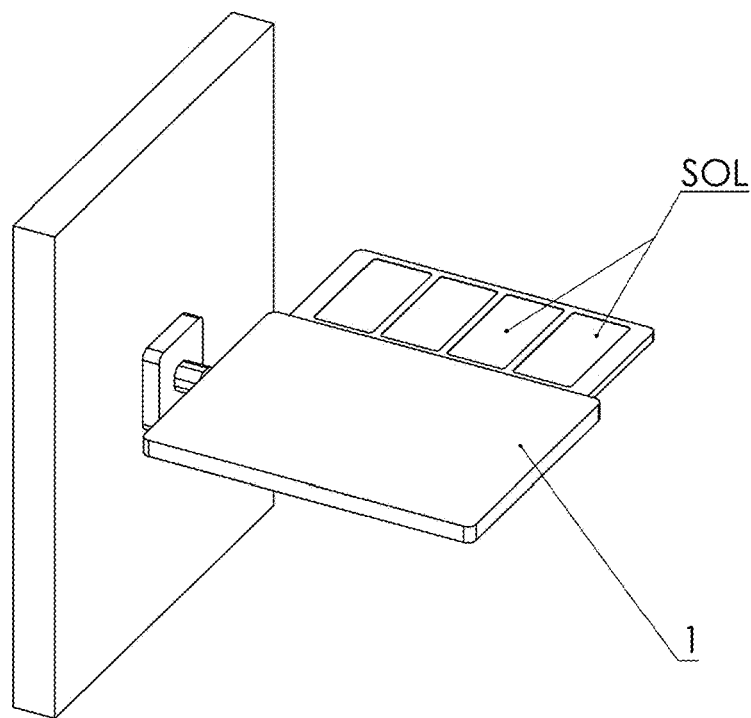
FIG. 27 shows a diagram illustrating a top perspective view of a charger shelf with photo-voltaic solar cells, according to an embodiment of the present disclosure.

FIG. 27 shows a diagram illustrating a top perspective view of a charger shelf with photo-voltaic solar cells, according to an embodiment of the present disclosure.

Referring to FIG. 27, the shelf 1 is equipped with at least one photo-voltaic cell SOL that may provide power to the coils and/or the battery BAT.

Figure 28:
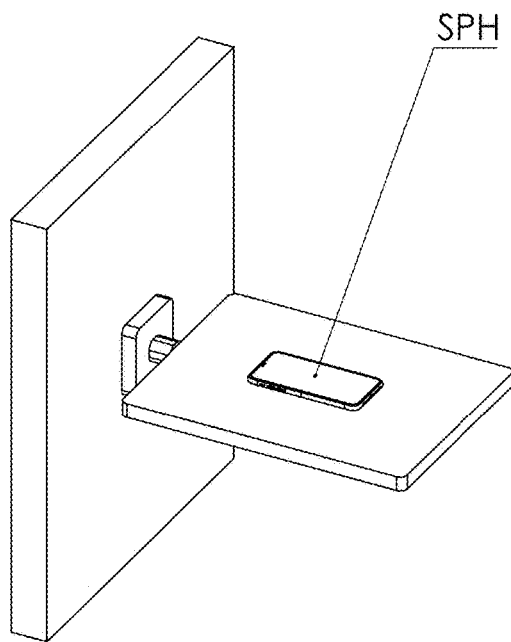
FIG. 28 shows a diagram illustrating a top perspective view of a charger shelf charging a smartphone, according to an embodiment of the present disclosure.

FIG. 28 shows a diagram illustrating a top perspective view of a charger shelf charging a smartphone, according to an embodiment of the present disclosure.

Referring to FIG. 28, the shelf 1 may wirelessly charge a smartphone SPH placed on a top surface of the shelf 1.

Figure 29:
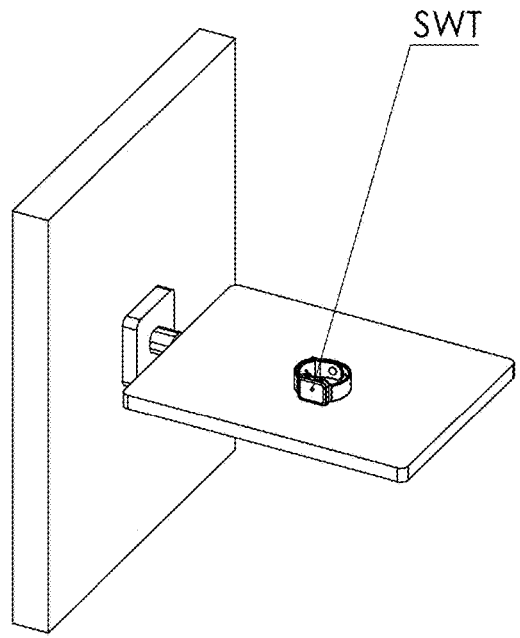
FIG. 29 shows a diagram illustrating a top perspective view of a charger shelf charging a smartwatch, according to an embodiment of the present disclosure.

FIG. 29 shows a diagram illustrating a top perspective view of a charger shelf charging a smartwatch, according to an embodiment of the present disclosure.

Referring to FIG. 29, the shelf 1 may wirelessly charge a smartwatch SWT placed on a top surface of the shelf 1.

Figure 30:
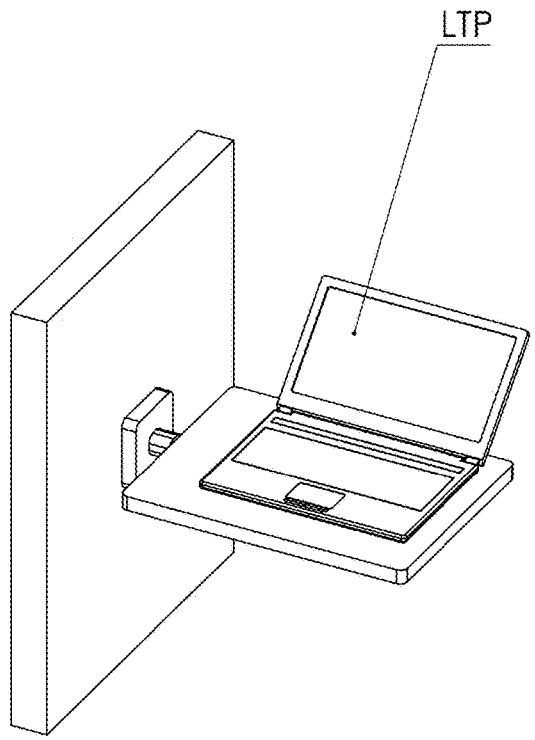
FIG. 30 shows a diagram illustrating a top perspective view of a charger shelf charging a laptop computer, according to an embodiment of the present disclosure.

FIG. 30 shows a diagram illustrating a top perspective view of a charger shelf charging a laptop computer, according to an embodiment of the present disclosure.

Referring to FIG. 30, the shelf 1 may wirelessly charge a laptop LTP placed on a top surface of the shelf 1.

Figure 31:
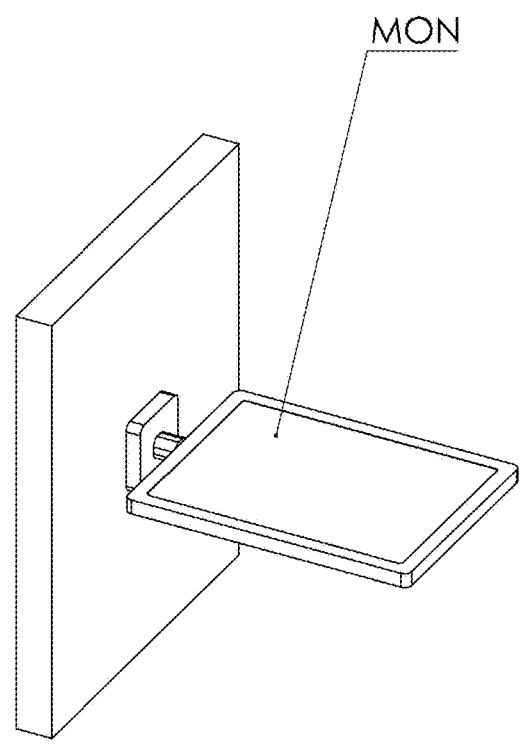
FIG. 31 shows a diagram illustrating a top perspective view of a charger shelf with a display monitor, according to an embodiment of the present disclosure.

FIG. 31 shows a diagram illustrating a top perspective view of a charger shelf with a display monitor, according to an embodiment of the present disclosure.

Referring to FIG. 31, the shelf 1 may include a monitor MON on a top surface of the shelf 1. Alternatively, the monitor MON can be built into other surfaces of the shelf 1. In addition, the shelf 1 may include a built-in modem, which when used with the monitor MON, may display media obtained over the Internet.

Figure 32:
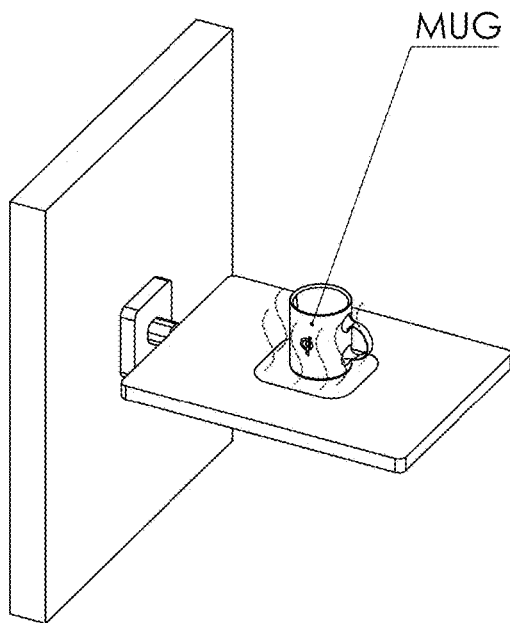
FIG. 32 shows a diagram illustrating a top perspective view of a charger shelf powering a heating device, according to an embodiment of the present disclosure.

FIG. 32 shows a diagram illustrating a top perspective view of a charger shelf powering a heating device, according to an embodiment of the present disclosure.

Referring to FIG. 32, the shelf 1 may wirelessly provide power to a heating station to heat a mug that is placed on a top surface of the shelf 1.

Figure 33:
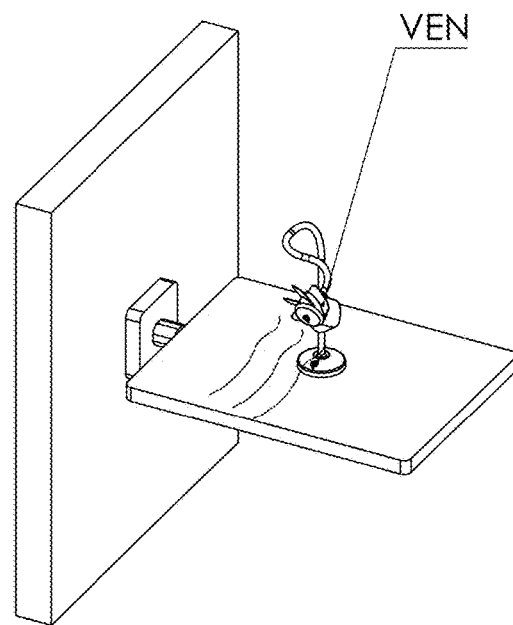
FIG. 33 shows a diagram illustrating a top perspective view of a charger shelf powering an air conditioning device, according to an embodiment of the present disclosure.

FIG. 33 shows a diagram illustrating a top perspective view of a charger shelf powering an air conditioning device, according to an embodiment of the present disclosure.

Referring to FIG. 33, the shelf 1 may wirelessly provide power to an air conditioning device VEN that is placed on a top surface of the shelf 1.

Figure 34:
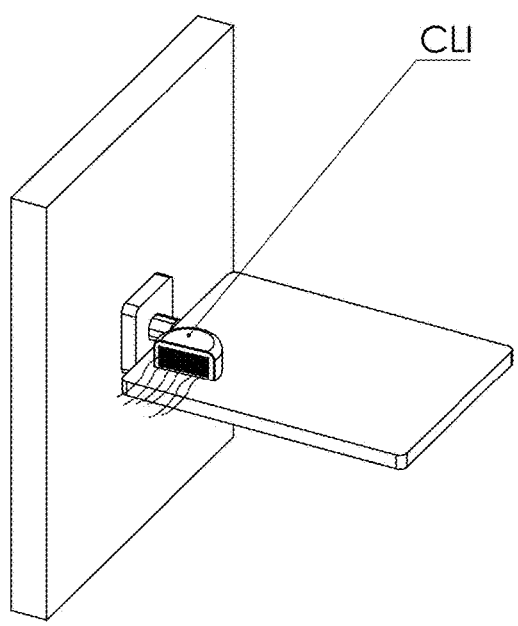
FIG. 34 shows a diagram illustrating a top perspective view of a charger shelf charging a climate control device, according to an embodiment of the present disclosure.

FIG. 34 shows a diagram illustrating a top perspective view of a charger shelf charging a climate control device, according to an embodiment of the present disclosure.

Referring to FIG. 34, the shelf 1 may wirelessly provide power to a climate control device CLI that is placed on a top surface of the shelf 1. The climate control device CLI may provide hot or cold air, may filter air, or may humidify air.

Figure 35:
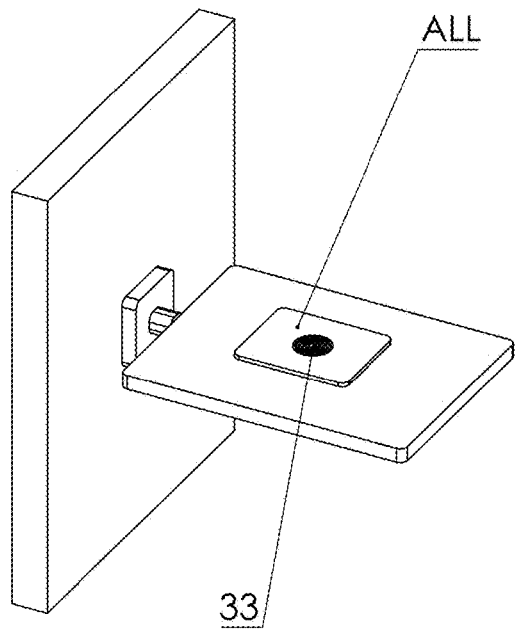
FIG. 35 shows a diagram illustrating a top perspective view of a charger shelf charging an inductively powered appliance, according to an embodiment of the present disclosure.

FIG. 35 shows a diagram illustrating a top perspective view of a charger shelf charging an inductively powered appliance, according to an embodiment of the present disclosure.

Referring to FIG. 35, the inductively powered appliance ALL may be placed on or around a charging coil 33 located within the shelf 1. Once in place, the inductively powered appliance ALL may receive power. The inductively powered appliance may be any appliance capable of receiving power from the shelf 1.

Figure 36:
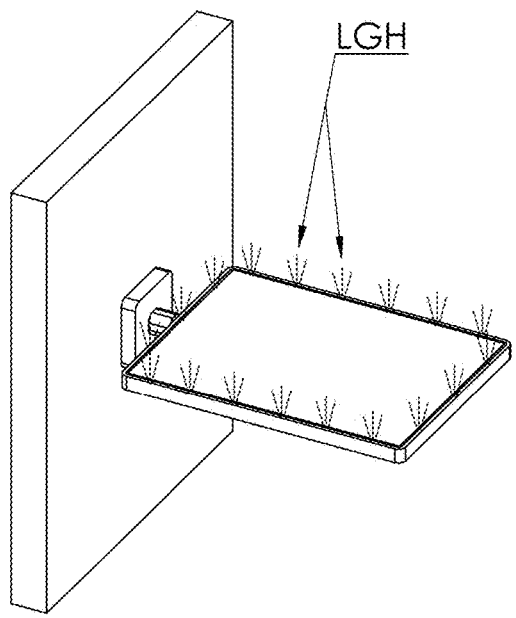
FIG. 36 shows a diagram illustrating a top perspective view of a charger shelf including perimeter illumination, according to an embodiment of the present disclosure.

FIG. 36 shows a diagram illustrating a top perspective view of a charger shelf including perimeter illumination, according to an embodiment of the present disclosure. Referring to FIG. 36, the shelf 1 includes a perimeter backlight LGH along edges of the shelf 1 that upwardly projects light.

Figure 37:
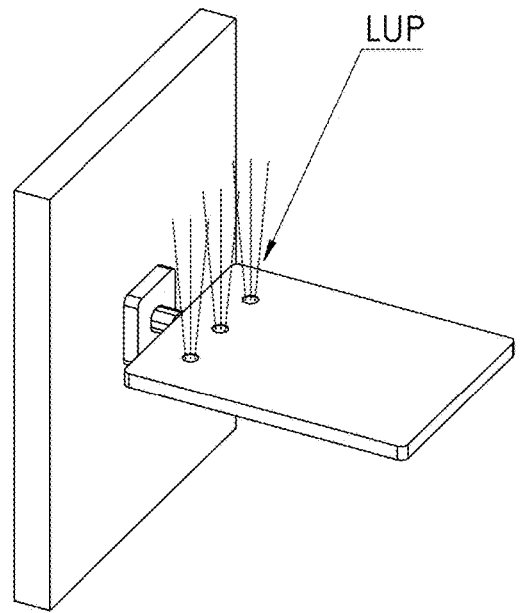
FIG. 37 shows a diagram illustrating a top perspective view of a charger shelf including illumination directed in an upward direction, according to an embodiment of the present disclosure.

FIG. 37 shows a diagram illustrating a top perspective view of a charger shelf including illumination directed in an upward direction, according to an embodiment of the present disclosure.

Referring to FIG. 37, the shelf 1 includes a backlight LUP positioned on one side of the top surface of the shelf 1 that upwardly projects light.

Figure 38:
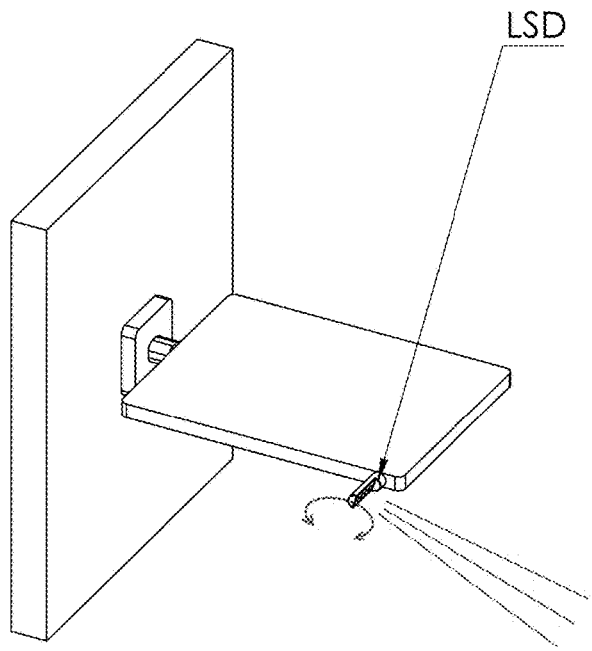
FIG. 38 shows a diagram illustrating a top perspective view of a charger shelf including illumination outwardly rotatable from a side of the panel device, according to an embodiment of the present disclosure.

FIG. 38 shows a diagram illustrating a top perspective view of a charger shelf including illumination outwardly rotatable from a side of the panel device, according to an embodiment of the present disclosure.

Referring to FIG. 38, the shelf 1 includes a backlight LSD extending from a side of the shelf 1 and is rotatable with respect to a surface of the shelf 1.

Figure 39:
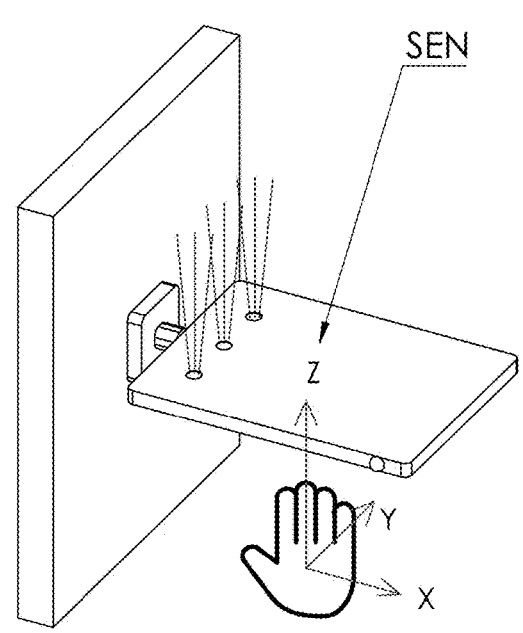
FIG. 39 shows a diagram illustrating a top perspective view of a charger shelf including multiple illumination modes with a motion detector, according to an embodiment of the present disclosure.

FIG. 39 shows a diagram illustrating a top perspective view of a charger shelf including multiple illumination modes with a motion detector, according to an embodiment of the present disclosure.

Referring to FIG. 39, the shelf 1 is equipped with a motion sensor SEN capable of being used to activate an illumination state of the shelf 1. For example, an illumination mode of the panel device may be in an inactive state (e.g., a sleep state), but may be switched to an active state when motion is detected.

Figure 40:
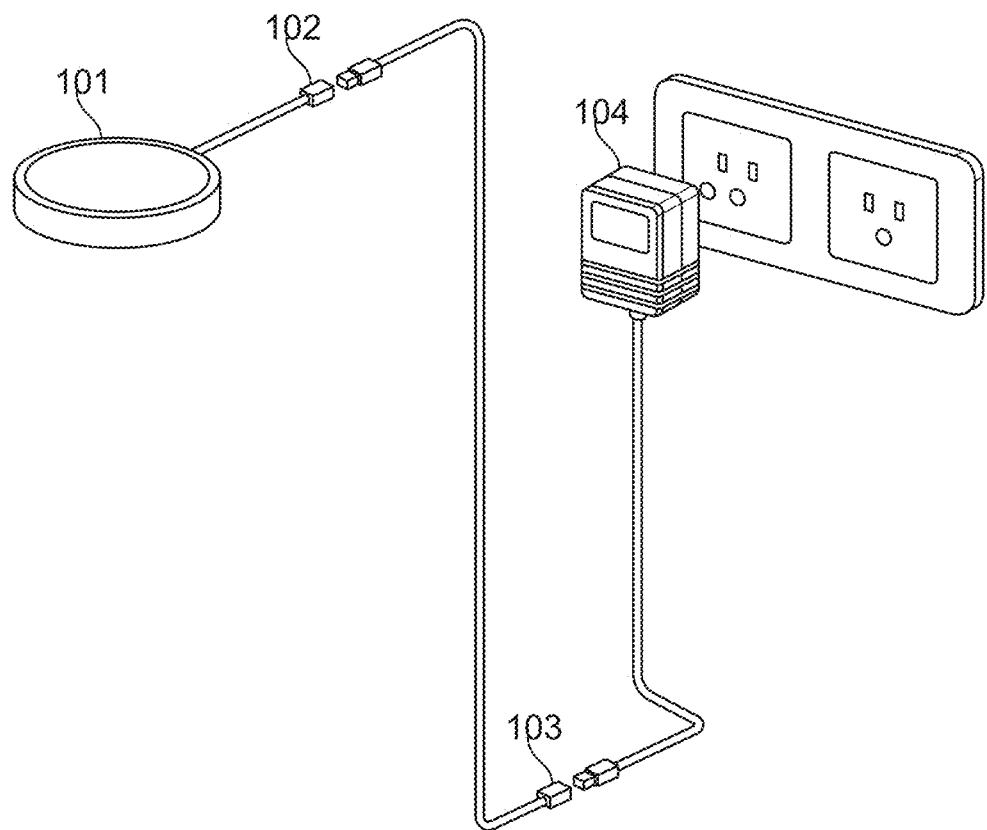
FIG. 40 shows a diagram illustrating a configuration of a wireless charger, according to an embodiment of the present disclosure.

FIG. 40 is a diagram illustrating a configuration of a wireless charger, according to an embodiment of the present disclosure.

The wireless charger of FIG. 40 includes a charging pad 101. The charging pad 101 may include a coil capable of producing an electromagnetic field that extends outward from the charging pad 101. The coil may be embedded inside the charging pad 101 so that an electronic device can be placed in an electromagnetic field by being placed on top of or near a surface of the charging pad 101. The charging pad 101 may be attached to a first cable (i.e., wire) which connects to a first electrical connector 102.

The first electrical connector 102 is connected to a second cable which is connected to a second electrical connector 103. The second electrical connector 103 is connected to a third cable which connects to the wall power supply 104. The first electrical connector 102 and the second electrical connector 103 are detachable such that each may be used to connect or disconnect the charging pad 101 from the wall power supply 104.

The wall power supply 104 may connect to a standard United States power supply of 120 volts (V) at 60 hertz (Hz), or may be connected to other power supply voltages and/or frequencies (i.e., alternating current and/or direct current power).

The first electrical connector 102 and the second electrical connector 103 are detachable, therefore the charging pad 101 may be detached from the second cable, the third cable, and the wall power supply 104. Likewise, the wall power supply 104 may be detached from the second cable, the first cable, and the wireless charger.

An electrical connector may be any device capable of forming an electrical connection among two or more electronic circuits. That is, when an electrical connector is in a disconnected state, the two or more electronic circuits may not be electronically coupled to each other. When an electrical connector is in a connected state, the two or more electronic circuits may be electronically coupled to each other.

Figure 41:
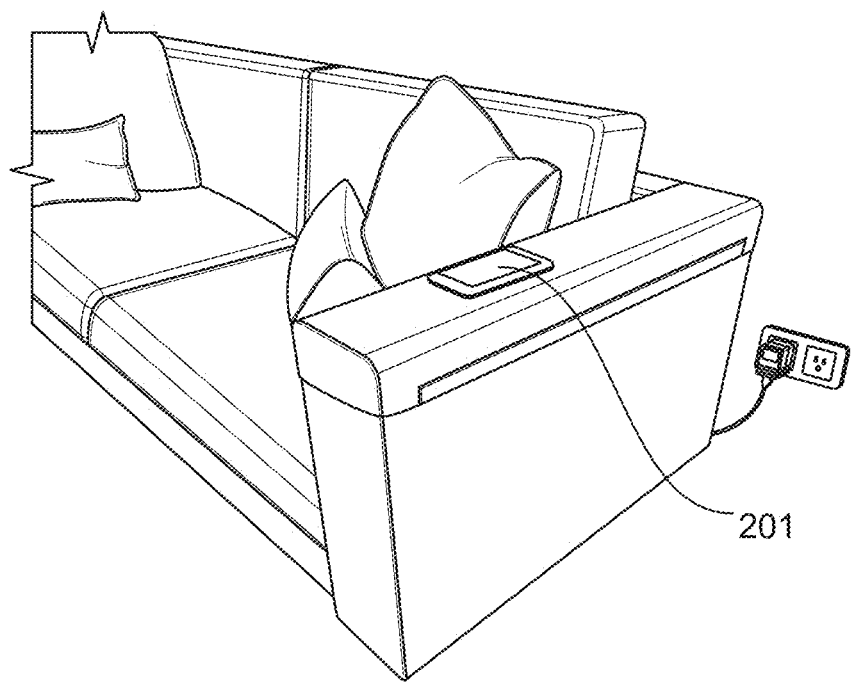
FIG. 41 shows a diagram illustrating a sofa armrest with a wireless charger embedded therein, according to an embodiment of the present disclosure.

FIG. 41 shows a diagram illustrating a sofa armrest with a wireless charger embedded therein, according to an embodiment of the present disclosure.

Referring to FIG. 41, the wireless charger is embedded into the armrest of the sofa such that an electronic device 201 may be wirelessly charged by being placed on top of the armrest near the embedded wireless charger.

By embedding the wireless charger inside of the armrest of the sofa, many of the wires of the wireless charger are hidden from view such that the charging configuration is aesthetically pleasing.

Figure 42:
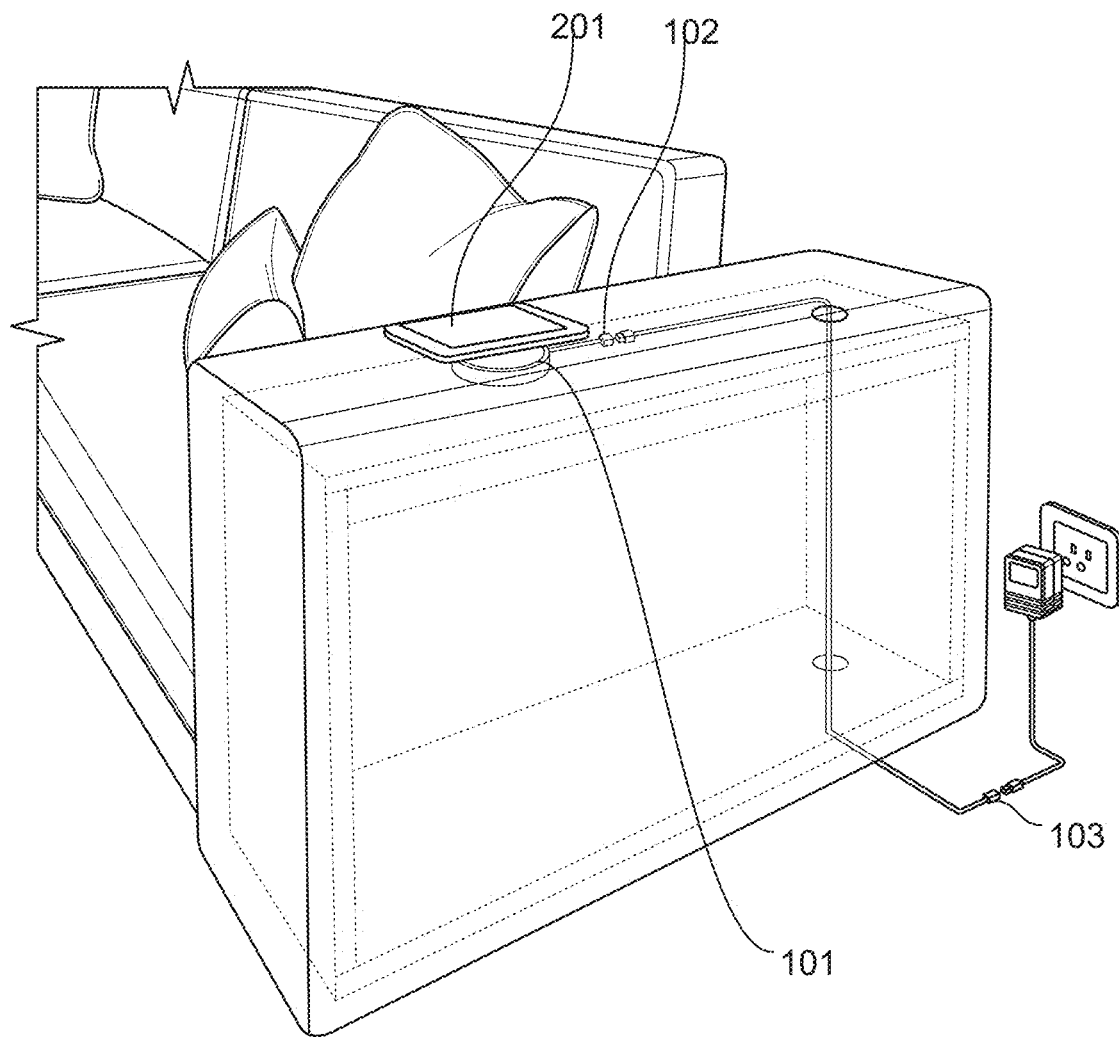
FIG. 42 shows a diagram illustrating a transparent view of a configuration of a wireless charger embedded in a sofa armrest, according to an embodiment of the present disclosure.

FIG. 42 shows a diagram illustrating a transparent view of a configuration of a wireless charger embedded in a sofa armrest, according to an embodiment of the present disclosure.

In particular, the positioning of the charging pad 101, the first electrical connector 102, and the second electrical connector 103 within the armrest is revealed by the transparent armrest.

The charging pad 101 is located a predetermined distance (i.e., 2.7 to 3.3 millimeter) below the top surface of the armrest. The first electrical connector 102 is located inside of a top portion of the armrest and the second electrical connector 103 is located outside of the armrest such that the second electrical connector 103 can easily be accessed without having to disassemble, reconfigure, or open the sofa armrest. Thus, the charging pad 101, which is embedded in the sofa armrest, may be disconnected from the wall power source by adjusting the second electrical connector 103 to be in a disconnected state (i.e., opening the second electrical 103).

Figure 43:
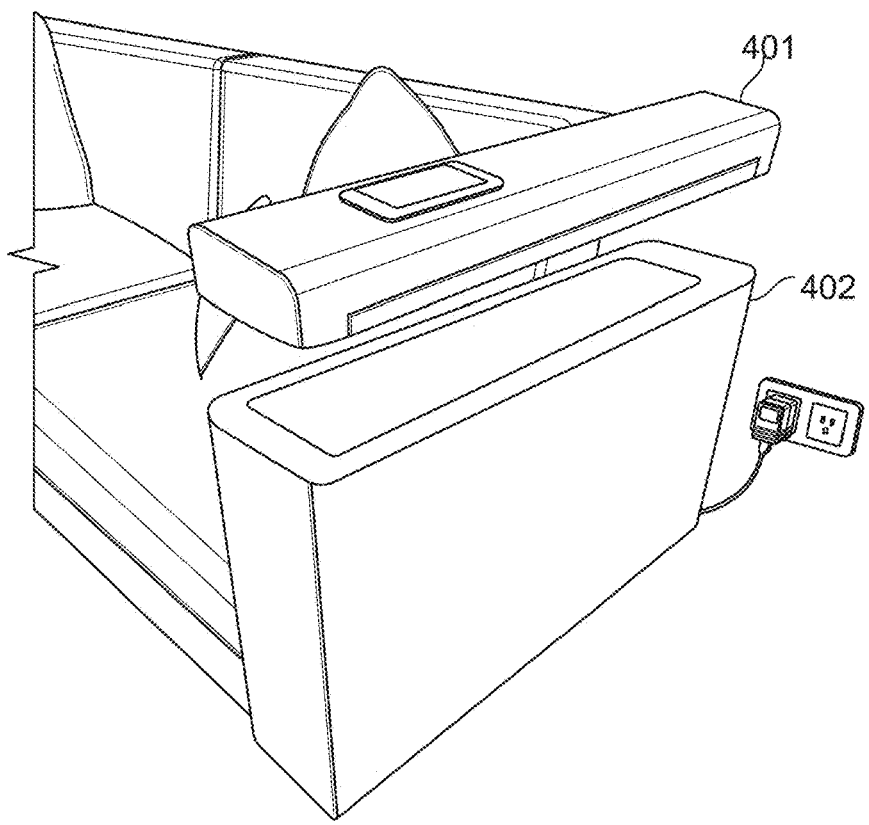
FIG. 43 shows a diagram illustrating accessing an interior of a sofa armrest via a service access point, according to an embodiment of the present disclosure.

FIG. 43 shows a diagram illustrating accessing an interior of a sofa armrest via a service access point, according to an embodiment of the present disclosure.

The service access point enables a top portion 401 of the armrest to be separated from a lower portion 402. The service access point may be a zipper or other means (i.e., a magnet or a locking mechanism) for attaching/detaching the top portion 401 to the lower portion 402. Alternatively, rather than completely separating a top portion 401 of the armrest from a lower portion 402 of the armrest, a service access point may be accessed through a pocket, hole, or window, which may be opened using a zipper, magnet, or a locking mechanism.

The service access point provides access to the charging pad 101, the first electrical connector 102, and/or the second electrical connector 103 when they are located inside of the armrest.

According to the present disclosure, a power charger can easily be replaced by using the service access point. For example, a user may notice that his or her electronic device (i.e. mobile phone) is not properly charging, and he or she may be inclined to attempt to fix the wireless charger. If the charger continues to not be working properly, then the user may decide that it is necessary to gain access to the charging pad 101 to troubleshoot it and/or replace it. Alternatively, if the user cannot gain access to the charging pad 101, then the user may decide it is necessary to replace the entire piece of furniture which houses the charging pad 101.

The service access point provides access to the interior of the sofa armrest, thereby allowing the user to troubleshoot and/or replace a portion of the wireless charger. For example, the first electrical connector 102 and/or the second electrical connector 103 may be switched to a disconnected state so that the top portion 401 of the armrest can be separated from the lower portion 402 of the armrest without wires limiting physical access to the service access point.

Thus, the service access point may allow a user to replace the wireless charger without having to replace the sofa armrest. In other words, if the wireless charger is built into the sofa armrest and cannot easily be accessed, then a user may be inclined to replace the sofa armrest and/or the sofa if the wireless charger is not operating properly.

Figure 44:
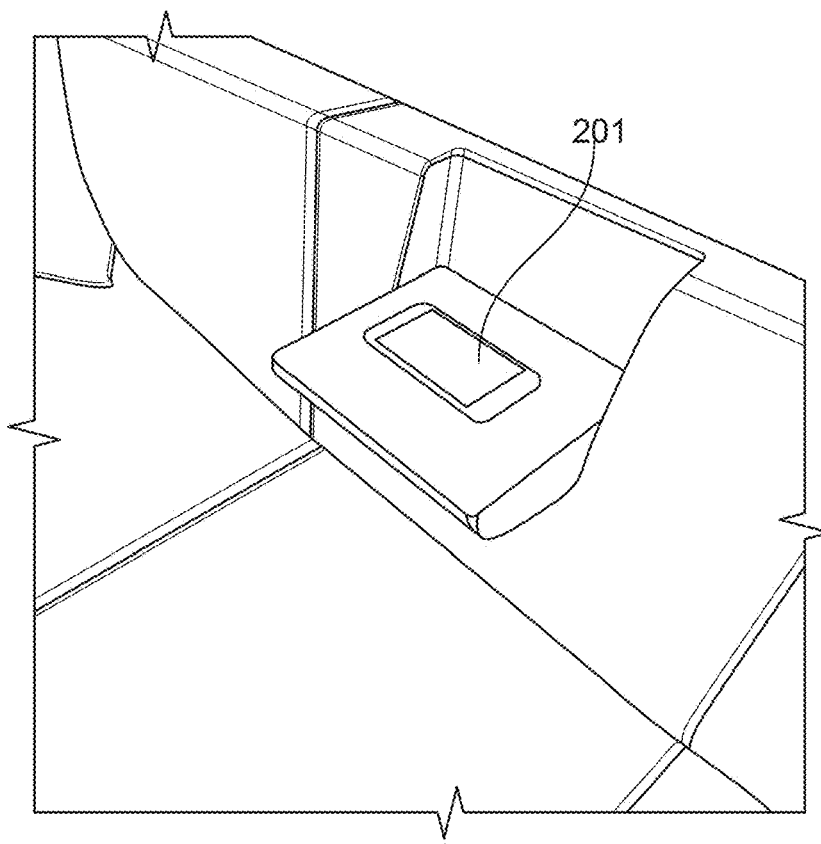
FIG. 44 shows a diagram illustrating a sofa cushion with a wireless charger embedded therein, according to an embodiment of the present disclosure.

FIG. 44 shows a diagram illustrating a configuration of a wireless charger embedded in a sofa cushion, according to an embodiment of the present disclosure.

Referring to FIG. 44, the sofa cushion may flip down to provide access to the embedded wireless charger. That is, the charging pad 101 of the wireless charger can be located in a sofa cushion that may be opened from a first position to a second position. The first position may be a regular sofa orientation which a sofa cushion can be ordinary used (i.e., by allowing the user to sit on or against it). The second position may be a flipped down position of a portion of the sofa cushion which may provide an area for an electronic device 201 to be placed such that a wireless charger embedded in the flipped down portion of the sofa provides wireless charging to the electronic device 201.

Figure 45:
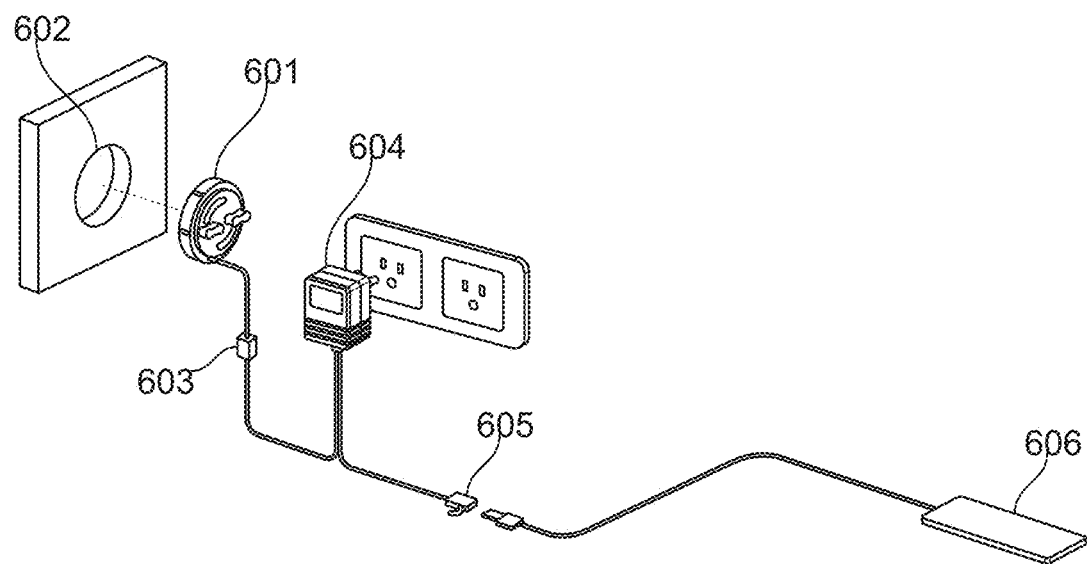
FIG. 45 shows a diagram illustrating a configuration of a charger, according to an embodiment of the present disclosure.

FIG. 45 shows a diagram illustrating a configuration of a charger, according to an embodiment of the present disclosure.

Referring to FIG. 45, a wireless charging pad (i.e., a coil for electromagnetic induction) may be located inside of a locking mechanism 601. The coil may be wound around a central point for generating an electromagnetic field. The locking mechanism 601 may snugly fit inside of a pre-bored hole 602. The locking mechanism 601 including the wireless charging pad can then be placed into a section of the sofa.

Sofas and other furniture for use with a wireless charging pad may contain pre-bored holes, which may be custom-made by a furniture factory. The pre-bored holes may be located on the bottom of, on the side of, on the top of, inside of, or outside of furniture to accommodate the wireless charging device. For example, a wireless charging device having a locking mechanism 601 may be placed into one of the pre-bored holes 602 and placed into a locked position such that an edge of the furniture is flush. Additionally, a furniture cover may be placed over the locking mechanism 601 in the pre-bored hole 602.

When the locking mechanism 601 is placed into a pre-bored hole, a user may lock the locking mechanism 601 into place to affix a charger to the furniture. When it is desirable to remove the charger, a customer may unlock the locking mechanism 601 to remove it from the furniture. The locking mechanism 601 may include part or all of the charger. The charger may be a wired charger or a wireless charger.

The locking mechanism 601 may be connected by a first wire to an electrical connector 603, which is connected to a wall power supply 604. A USB power extension may be connected to the wall power supply 604 such that power can simultaneously be output to the wireless charging pad in the locking mechanism 601 through the electrical connector 603, and to the USB power extension 605. An electronic device 606 may be connected to the USB power extension 605 to receive a charge.

In order to attach the locking mechanism 601 to the furniture, the locking mechanism 601 may be placed into a pre-bored (previously drilled) mounting hole in the furniture. Next, a twist-lock turning part of the locking mechanism 601 may be twisted in a predetermined direction (e.g., clockwise). When the locking mechanism 601 is twisted in the predetermined direction, elastic latches may protrude in a direction away from the center of the locking mechanism 601, causing the diameter of the locking mechanism 601 to increase. In this manner, the diameter of the locking mechanism 601 in the unlocked position may be less than the diameter of the locking mechanism 601 in the locked position.

By increasing the diameter of the locking mechanism 601 in the locked position, the locking mechanism 601 may be affixed to the interior walls of the pre-bored hole in the furniture. In this way, the locking mechanism 601 may be securely attached to the furniture when placed in the locked position.

Alternatively, the locking mechanism 601 may be attached to the pre-bored hole in the furniture using adhesive, latches, sliders, or clamps to fasten the wireless charger mounting mechanism into an intended position.

Accordingly, a user may make an installation decision regarding whether or not to install the locking mechanism 601 with a charging device in his/her furniture. This solution of reduces the risk of returning expensive furniture due to unsatisfactory performance of charging devices because a user may replace and/or reinstall part or all of a charging device associated with the furniture.

Figure 46:
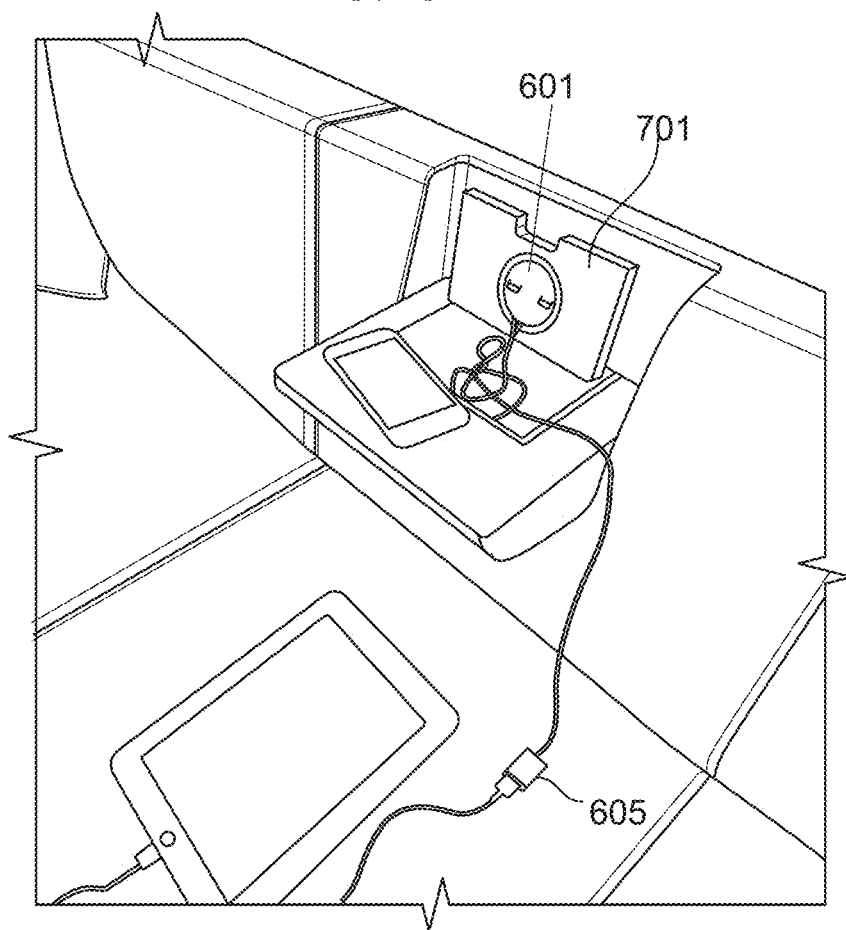
FIG. 46 shows a diagram illustrating a configuration of a charger embedded in a sofa cushion with a USB extension, according to an embodiment of the present disclosure.

FIG. 46 shows a diagram illustrating a configuration of a charger embedded in a sofa cushion with a USB extension, according to an embodiment of the present disclosure.

Referring to FIG. 46, the locking mechanism 601 may be locked into place inside of a portion of a sofa cushion. As illustrated in FIG. 46, a portion of the sofa cushion can be flipped down from a first position (i.e., closed position) to a second position (open position). The locking mechanism 601 may be in a locked position in a pre-bored hole. The pre-bored hole may be a part of a cover 701 which may be opened or closed to access an inside section of the portion of the flipped-down sofa cushion. The inside section of the portion of the sofa cushion may be used to place wires (i.e., USB power extension 605) when it is not being used.

Thus, a user may flip down a portion of a sofa cushion, thereby gaining access to the locking mechanism 601 having an embedded wireless charging pad. A user may charge a first electronic device by placing it on or near the locking mechanism 601 having the embedded wireless charging pad. The user may simultaneously charge a second electronic device by connecting it to the USB power extension 605.

Figure 47:
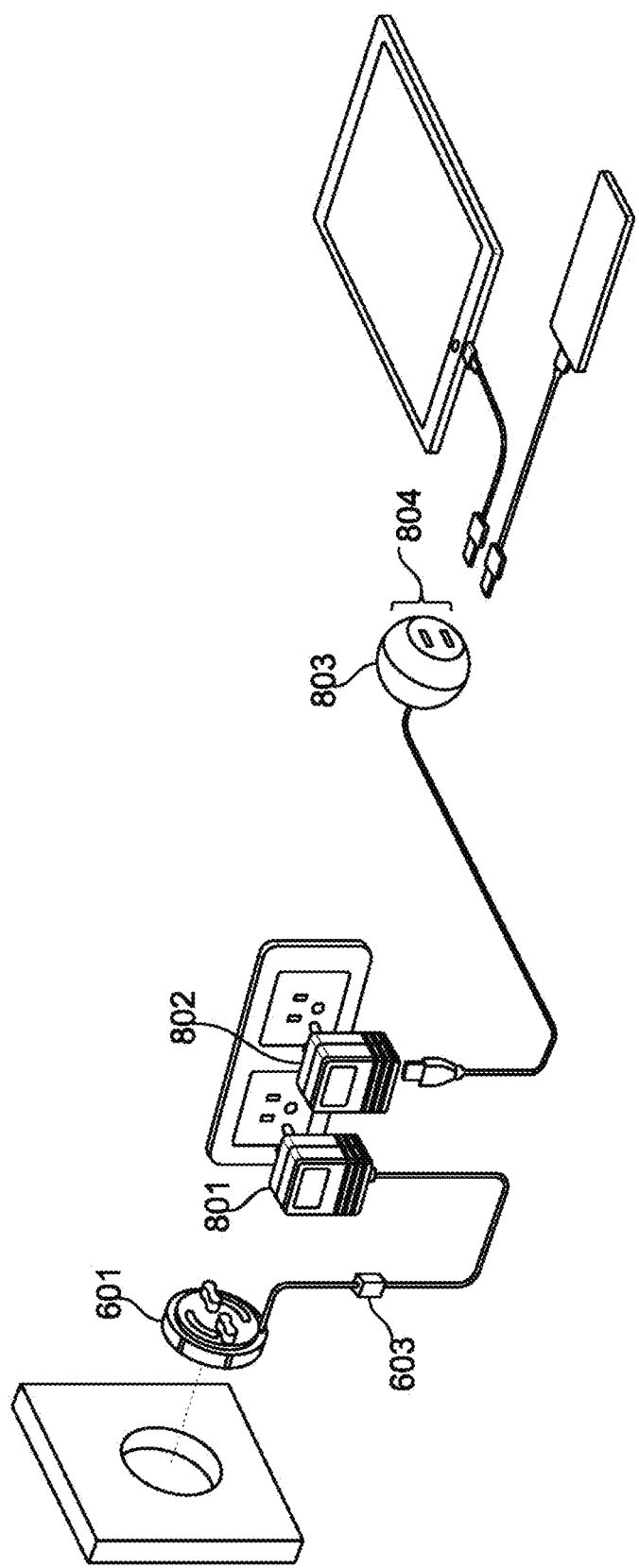
FIG. 47 shows a diagram illustrating a configuration of a wireless charger and a configuration of a wired ball USB charger, according to an embodiment of the present disclosure.

FIG. 47 shows a diagram illustrating a configuration of a wireless charger and a configuration of a wired ball USB charger, according to an embodiment of the present disclosure.

Referring to FIG. 47, a locking mechanism 601, including a wireless charging pad embedded therein, is connected to the power supply 801 through the electrical 603. The power supply 801 connects directly to the electrical 603 to provide power to the wireless charging pad embedded in the locking mechanism 601.

Additionally, a second power supply 802 may provide power to a USB ball charger 803. The USB ball charger 803 may be detachable from the second power supply 802 and may have two USB ports 804 for simultaneously charging two electronic devices through the two USB ports 804. In this manner, the USB ball charger 803 can easily be moved and placed in the best suited location for charging electronic devices.

Figure 48:
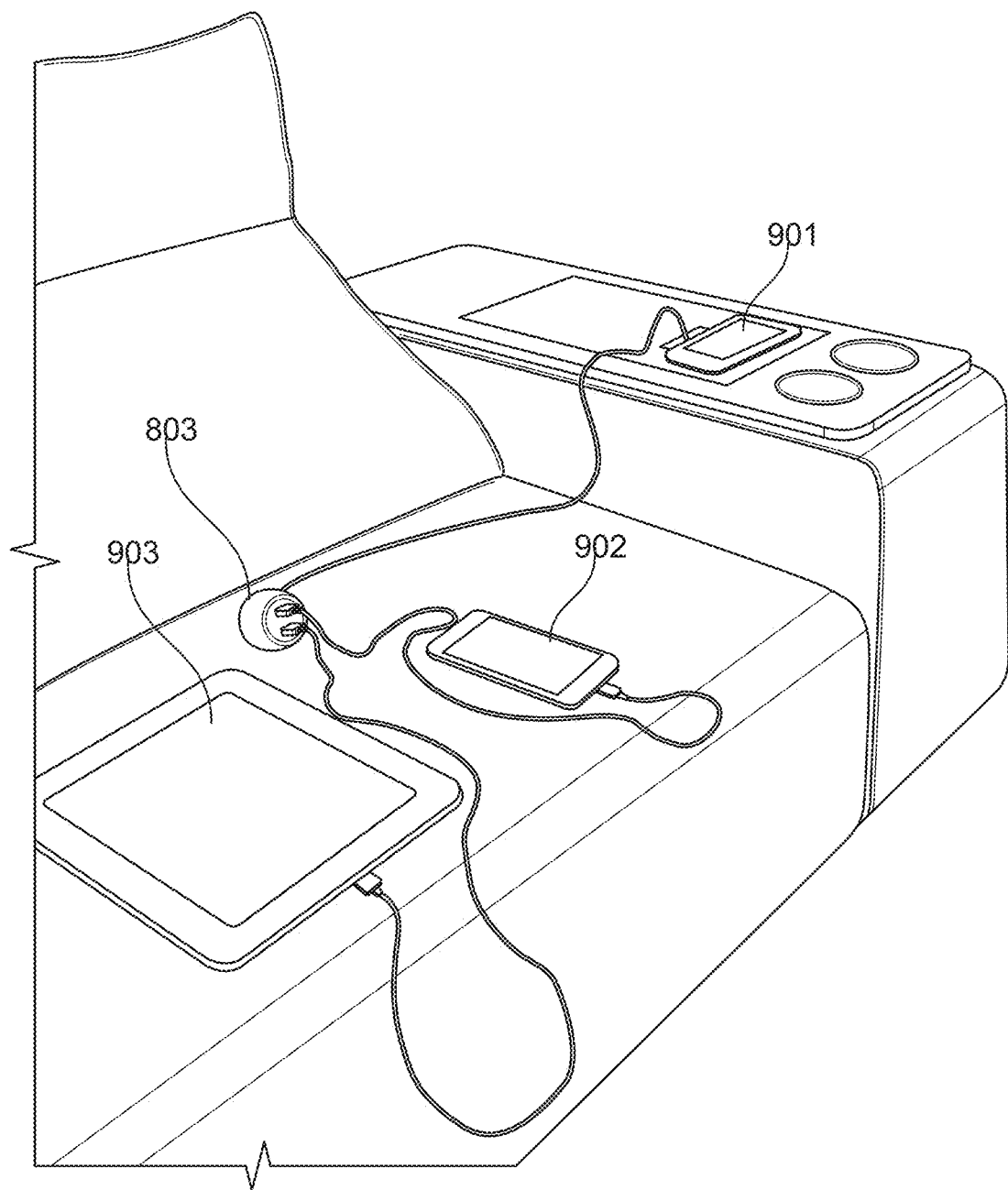
FIG. 48 shows a diagram illustrating a configuration of a charger embedded in a middle section with additional power outlets and a wired ball USB splitter, according to an embodiment of the present disclosure.

FIG. 48 shows a diagram illustrating a configuration of a charger embedded in a middle section with additional power outlets and a wired ball USB splitter, according to an embodiment of the present disclosure.

Referring to FIG. 48, three electronic devices may simultaneously be charged. A first electronic device 901 may wirelessly be charged through a wireless charging pad embedded into a middle section of a sofa. The first electronic device 901 may be placed on a portion of the middle section of the sofa that has a wireless charging pad embedded thereunder. For example, a wireless charging pad may be embedded into a locking mechanism, which can be inserted into a pre-bored hole. The locking mechanism may be hidden from view when the middle section of the sofa is in the closed position. That is, the pre-bored hole may be located on an inner surface of a door and/or flap such that the side of the door and/or flap opposite the locking mechanism provides a flush surface on which an electronic device 901 can wirelessly be charged.

Additionally, a second electronic device 902 and a third electronic device 903 can simultaneously be charged through the ball charger 803. The second electronic device 902 and the third electronic device 903 can be simultaneously charged while the first electronic device 901 is wirelessly being charged.

Figure 49:
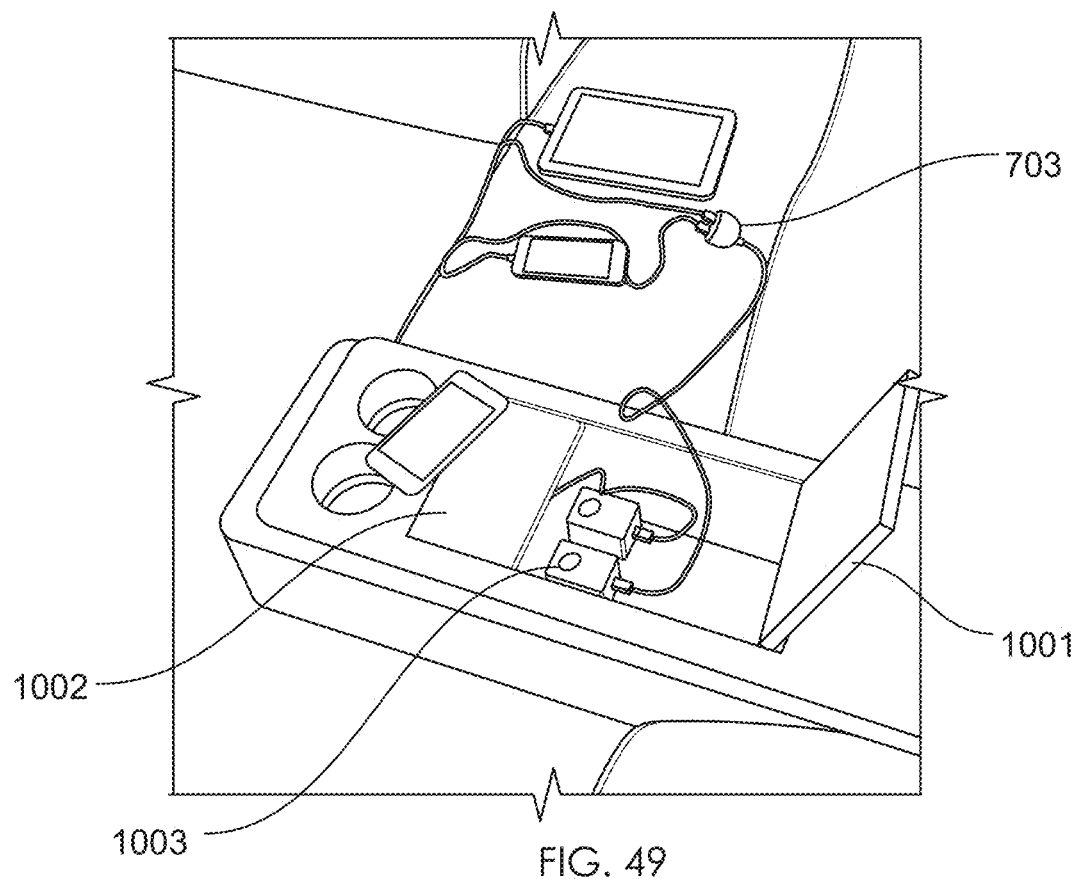
FIG. 49 shows a diagram illustrating an interior configuration of a charger embedded in a middle section with additional power outlets and a wired ball USB splitter, according to an embodiment of the present disclosure.

FIG. 49 shows a diagram illustrating an interior configuration of a charger embedded in a middle section with additional power outlets and a wired ball USB splitter, according to an embodiment of the present disclosure.

The middle section of the sofa may include hidden power outlets 1003 which are accessible by flipping open a small door 1001. The middle section may also include a wireless charger 1002 embedded therein.

Figure 50:
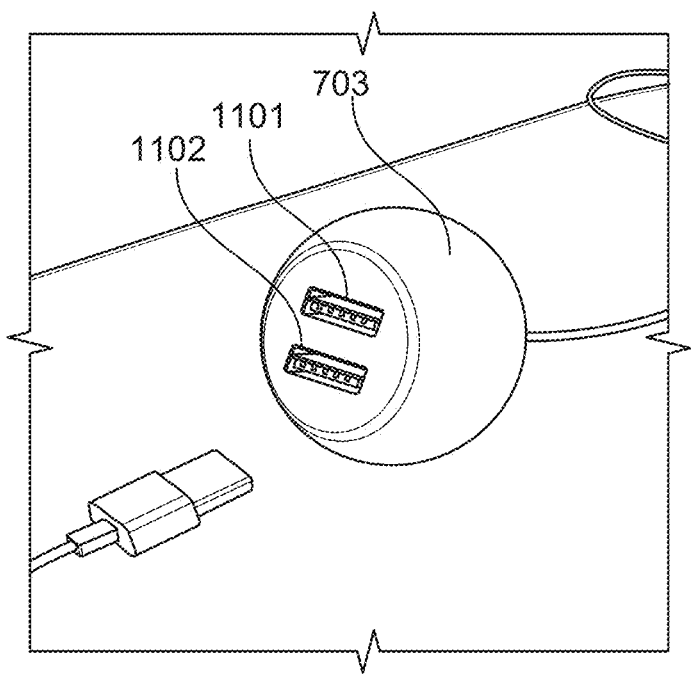
FIG. 50 shows a diagram illustrating a wired ball USB splitter, according to an embodiment of the present disclosure.

FIG. 50 shows a diagram illustrating a wired ball USB splitter, according to an embodiment of the present disclosure.

Referring to FIG. 50, the USB splitter may be a USB ball charger 803 (i.e., a half moon charger) capable of providing different power outputs to a first USB output socket 1101 and a second USB output socket 1102 according to what type of electronic device is plugged into each output socket.

The USB ball charger may include one or more custom integrated circuits (ICs) which may include a large variety of standards and protocols to communicate with many different types of electronic devices. For instance, when a first type of electronic device is connected to the USB output socket 1101, a custom IC may identify the type of electronic device by communicating with an external IC of the first electronic device and determine a first output power for charging. When a second type of electronic device is connected to the second USB output socket 1102, the custom IC may identify the second type of electronic device by communicating with an external IC of the second electronic device and determine a second output power for charging.

Additionally, the custom ICs may prioritize charging. For instance, when a first type of electronic device requires a relatively large power usage for charging when compared to a second type device, then the custom IC may distribute power in a way to ensure that both devices are charged according to their factory specifications. This may mean that the lower power usage device (i.e., the second type device) may first be charged completely and the higher power usage device may be charged after the lower power usage device is finished charging.

Figure 51:
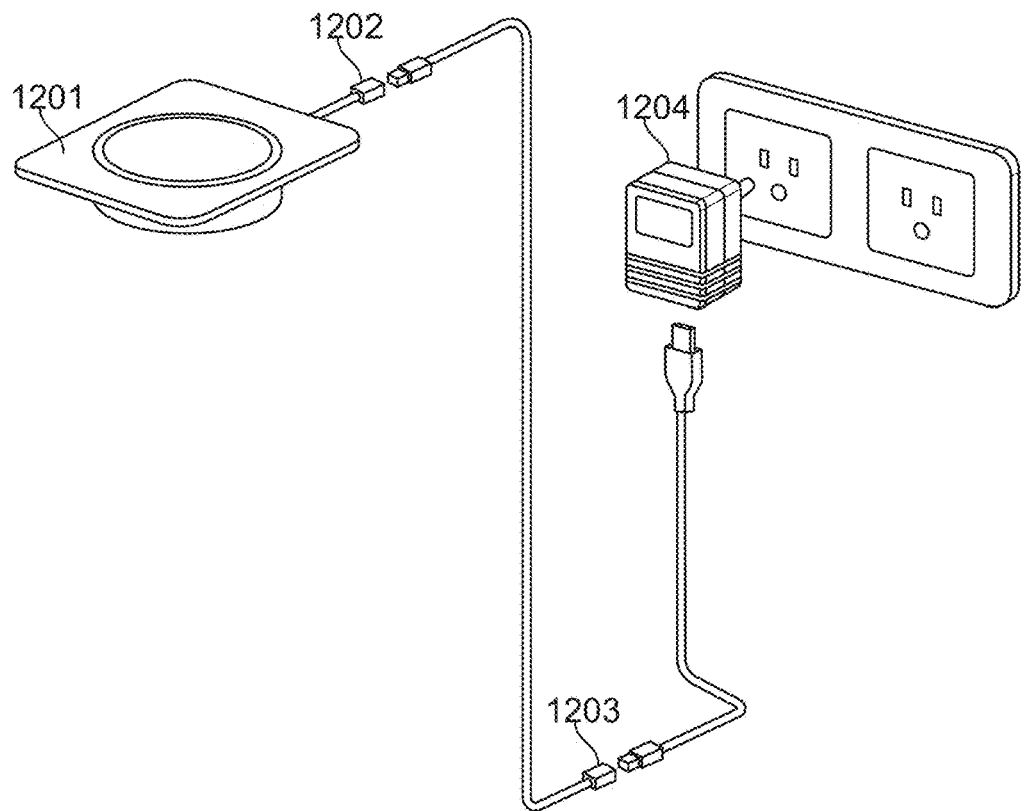
FIG. 51 shows a diagram illustrating a configuration of a wireless charger, according to an embodiment of the present disclosure.

FIG. 51 shows a diagram illustrating a configuration of a wireless charger, according to an embodiment of the present disclosure.

The wireless charger of FIG. 51 includes a charging pad 1201. The charging pad 1201 includes a coil capable of producing an electromagnetic field that extends outward from the charging pad 1201. The coil may be embedded inside the charging pad 1201 so that an electronic device may be positioned in the electromagnetic field by being placed on top of the surface of the charging pad 1201. The charging pad 1201 may be attached to a first cable which connects to a first electrical connector 1202.

The first electrical connector 1202 is connected to a second cable which is connected to a second electrical connector 1203. The second electrical connector 1203 is connected to a third cable which connects to the wall power supply 1204. The first electrical connector 1202 and the second electrical connector 1203 are detachable such that either one may be used to connect or disconnect the charging pad 1201 from the wall power supply 1204. Additionally, the third cable may be detachable from the wall power supply 1204 such that the wall power supply 1204 may be disconnected from the second electrical connector 1203.

In particular, the wall power supply 1204 may include a USB port for the third cable to be connected to. The wall power supply 1204 may connect to a standard United States power supply of 120 volts (V) at 60 hertz (Hz), or may be connected to other power supply voltages and/or frequencies (i.e., alternating current and/or direct current power).

The first electrical connector 1202 and the second electrical connector 1203 are detachable, therefore the wireless charger may be detached from the second cable, the third cable, and the wall power supply 1204. Likewise, the wall power supply 1204 may be detached from the second cable, the first cable, and the wireless charger.

Figure 52:
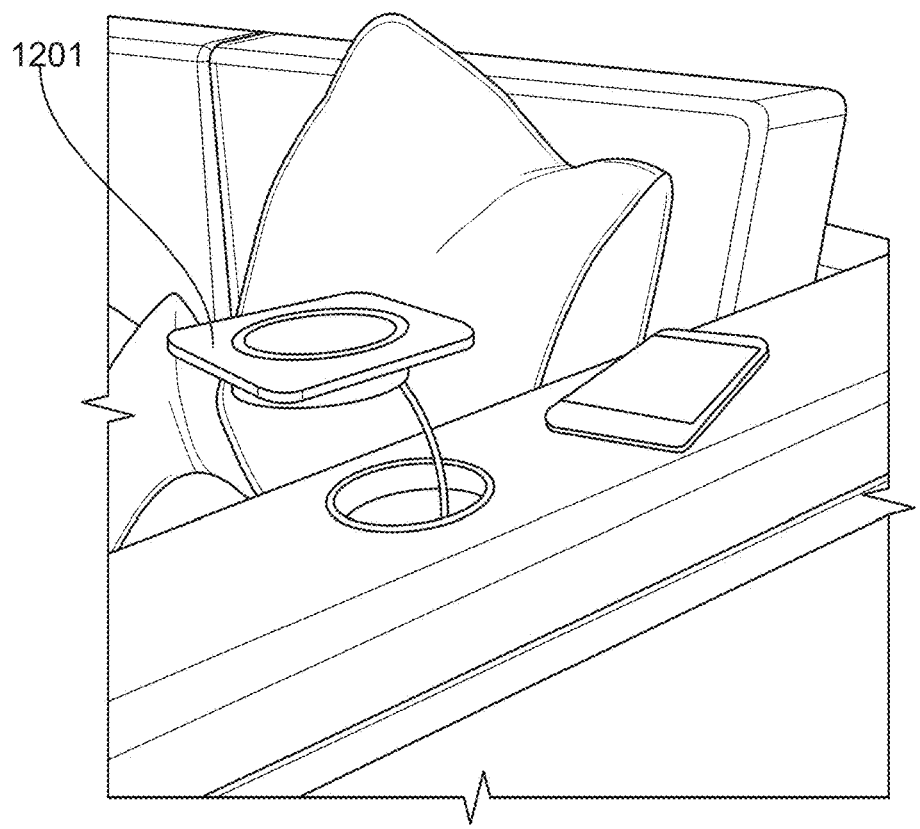
FIG. 52 shows a diagram illustrating a configuration of a wireless charging pad placed in a drink holder of an armrest, according to an embodiment of the present disclosure.

FIG. 52 shows a diagram illustrating a configuration of a wireless charging pad placed in a drink holder of an armrest, according to an embodiment of the present disclosure.

Referring to FIG. 52, the wireless charging pad 1201 may be formed to fit into a cup holder on an armrest of the sofa. Specifically, the bottom side of the wireless charging pad 1201 may be a shaped circularly so as to fit inside of the cup holder on the armrest of the sofa. In this manner, the wireless charging pad 1201 may appear to be attached to the armchair of the sofa because the wireless charging pad 1201 can be fitted to the cup holder. Additionally, the cable which attaches the wireless charging pad 1201 to the first electrical may run through the cup holder to access the interior of the sofa armchair. Therefore, the cable will not be visible when the wireless charger 1201 is placed into the cupholder.

Figure 53:
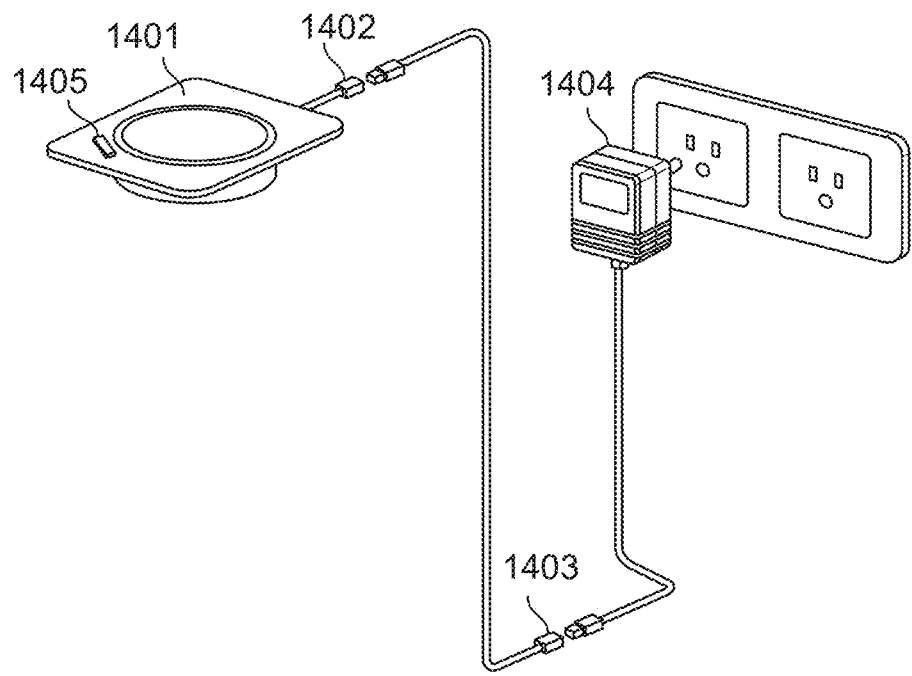
FIG. 53 shows a diagram illustrating a configuration of a wireless charger with a USB port for wired charging, according to an embodiment of the present disclosure.

FIG. 53 shows a diagram illustrating a configuration of a wireless charger with a USB port for wired charging, according to an embodiment of the present disclosure.

Referring to FIG. 53, the wireless charger includes a charging pad 1401. The charging pad 1401 includes a coil capable of producing an electromagnetic field that extends outward from the charging pad 1401. The coil may be embedded inside the charging pad 1401 so that an electronic device may be positioned in the electromagnetic field by being placed on top of the surface of the charging pad 1401.

In addition to including a wireless charger embedded therein, the charging pad 1401 may also include a USB port

1405 positioned on the exterior of the charging pad 1401. This configuration may allow for a user to wirelessly charge a first electronic device on the charging pad 1401 and to simultaneously charge a second electronic device through the USB port 1405.

The charging pad 1401 may be attached to a first cable which connects to a first electrical connector 1402. The first electrical connector 1402 may be connected to a second cable which may be connected to a second electrical connector 1403. The second electrical connector 1403 may be connected to a third cable which connects to the wall power supply 1404. The first electrical connector 1402 and the second electrical connector 1403 may be detachable such that either one may be used to connect or disconnect the charging pad 1401 to the wall power supply 1404.

The wall power supply 1404 may connect to a standard United States power supply of 120 volts (V) at 60 hertz (Hz), or may be connected to other power supply voltages and/or frequencies (i.e., alternating current and/or direct current power).

The first electrical connector 1402 and the second electrical connector 1403 may be detachable, therefore the wireless charger may be detached from the second cable, the third cable, and the wall power supply 1404. Likewise, the wall power supply 1404 may be detached from the second cable, the first cable, and the wireless charger.

Figure 54:
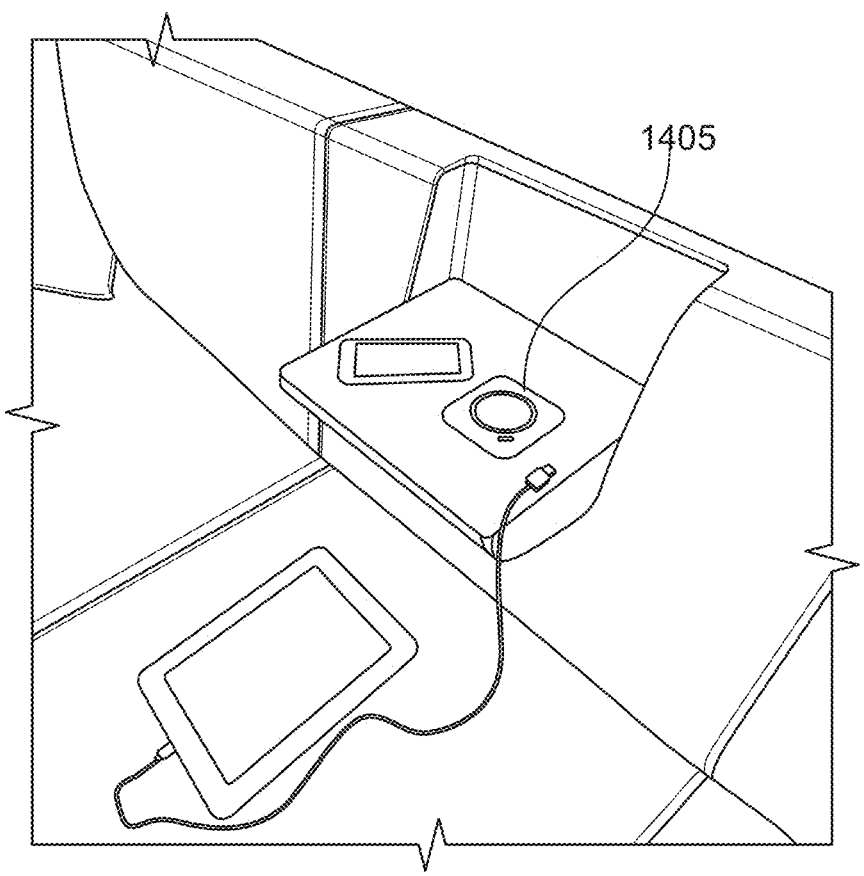
FIG. 54 shows a diagram illustrating a sofa cushion with a wireless charger positioned on a flip-down portion of a cushion, according to an embodiment of the present disclosure.

FIG. 54 shows a diagram illustrating a sofa cushion with a wireless charger positioned on a flip-down portion of a cushion, according to an embodiment of the present disclosure.

Referring to FIG. 54, the sofa cushion may flip down to provide access to the wireless charger. That is, the charging pad 1405 of the wireless charger can be located in a sofa cushion that may be opened from a first position to a second position. The first position may be a regular sofa orientation which a user can sit and/or ordinarily use a cushion. The second position may provide an area for an electronic device to be placed such that a wireless charger embedded in or placed on the flipped down portion of the sofa provides wireless charging to the electronic device.

Figure 55:
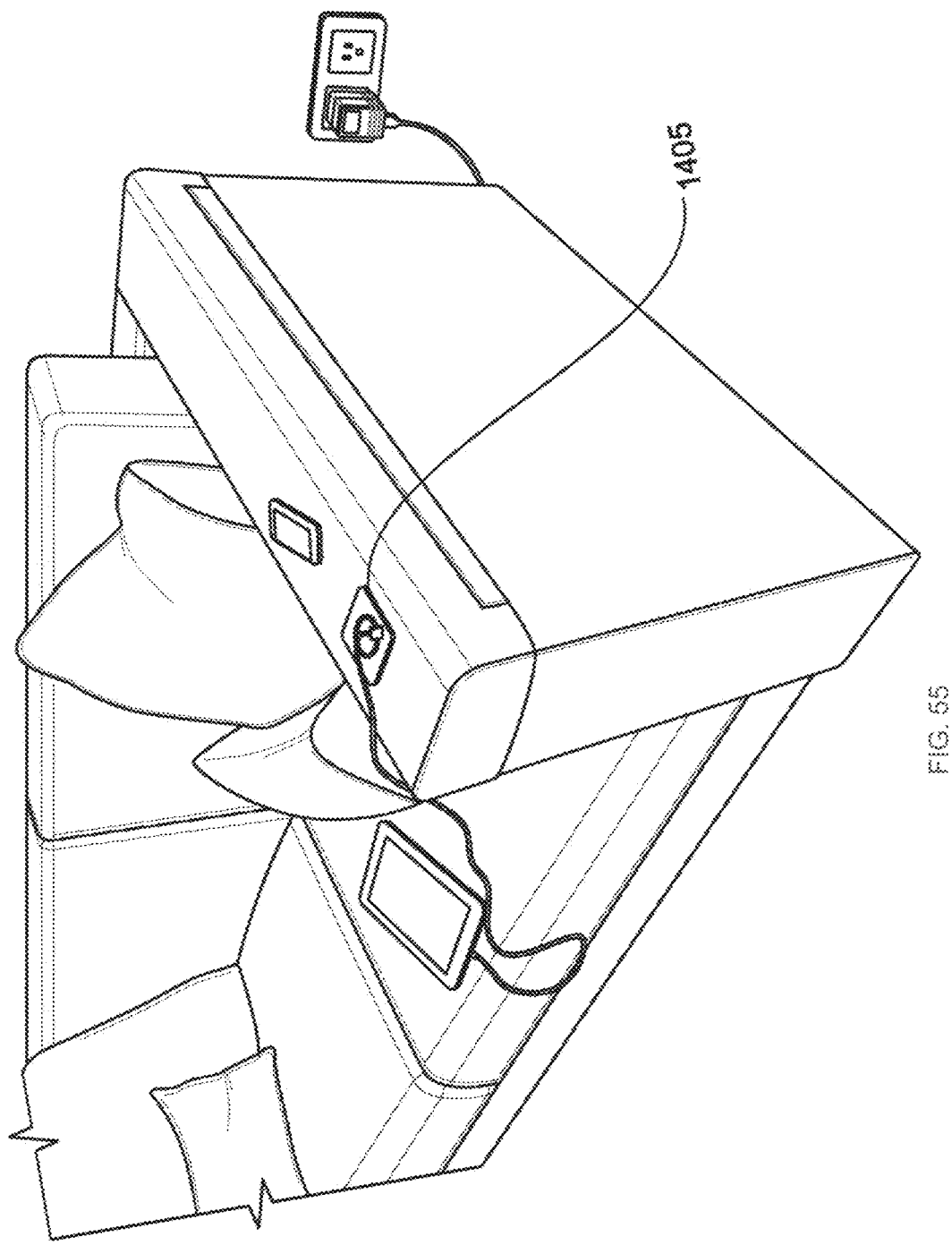
FIG. 55 shows a diagram illustrating a sofa armrest with a wireless charger with a USB port, according to an embodiment of the present disclosure.

FIG. 55 shows a diagram illustrating a sofa armrest with a wireless charger with a USB port, according to an embodiment of the present disclosure.

Referring to FIG. 55, the charging pad 1405 of the wireless charger can be positioned on top of the sofa armrest. The charging pad 1405 can wirelessly charge a first electronic device by placing it near or on top of the charging pad 1405.

Additionally, the charging pad 1405 can charge a second electronic device through a USB port located on the surface of the charging pad 1405.

FIGS. 56-60 are directed to a structure and operation of a charging system that performs charging through a non-transparent furniture panel. For example, the non-transparent furniture panel may not allow visible light and/or infrared radiation to visibly pass through a surface thereof.

Figure 56:
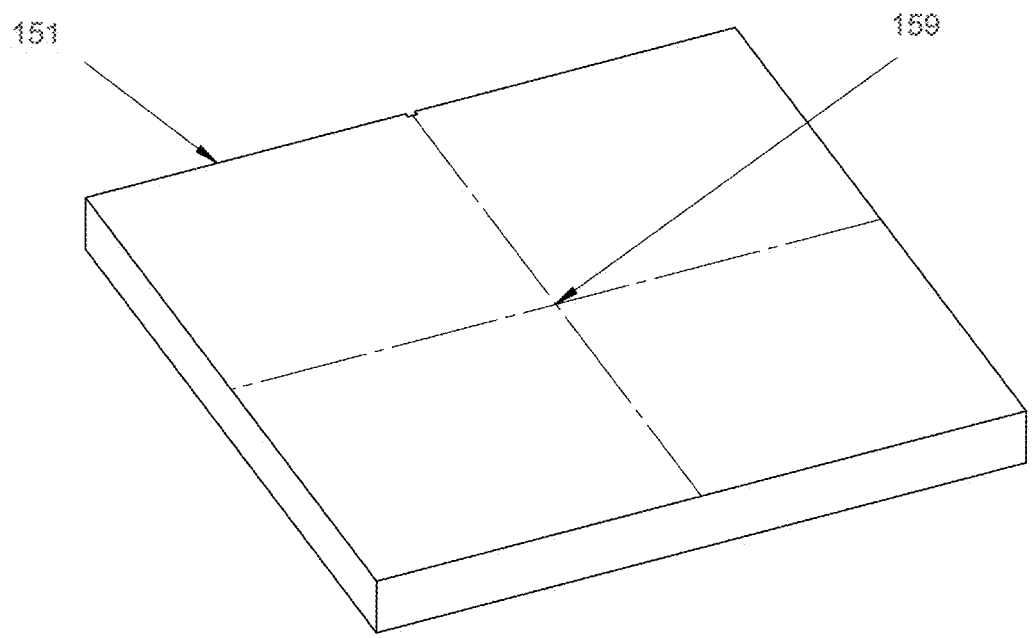
FIG. 56 shows a perspective view of a charging system through a furniture panel that is non-transparent to visible and infrared light, according to an embodiment of the present disclosure.
Figure 57:
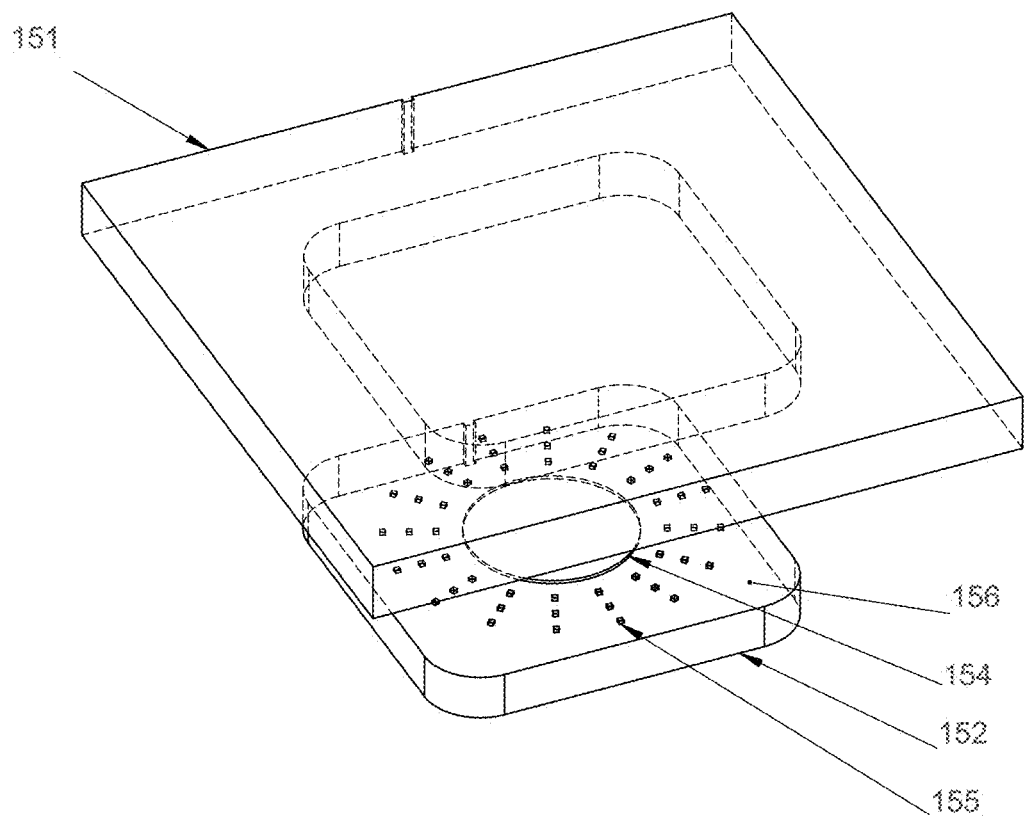
FIG. 57 shows an exploded perspective view of a charging system with a charging module, according to an embodiment of the present disclosure.
Figure 58:
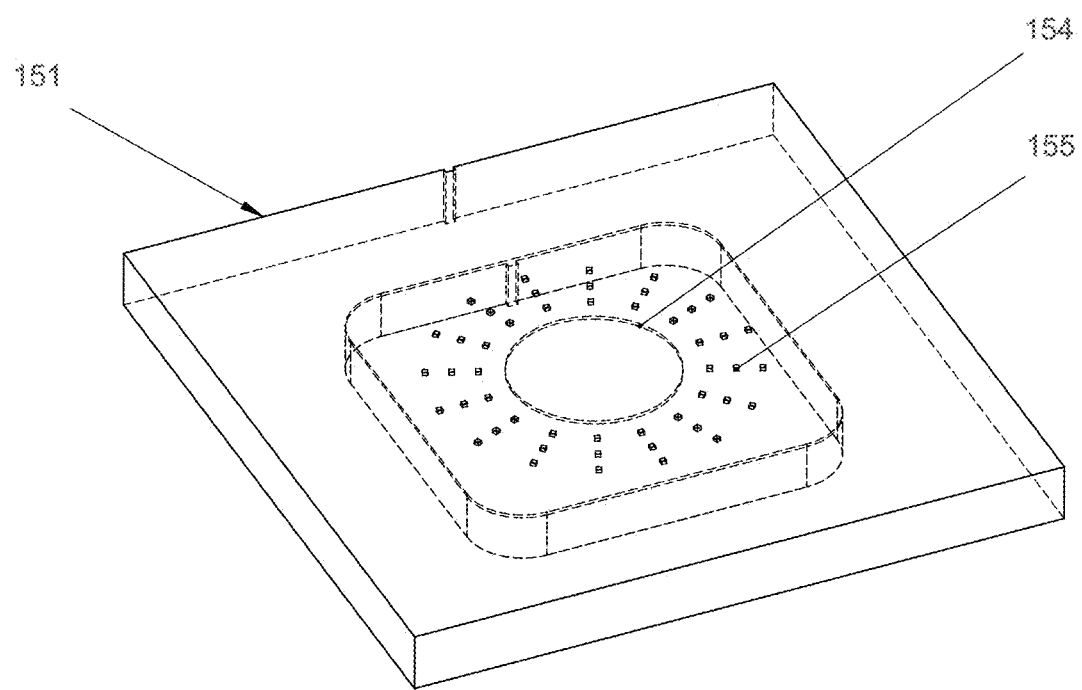
FIG. 58 shows an exploded perspective view of a loading system with a loading module shown, according to an embodiment of the present disclosure.
Figure 59:
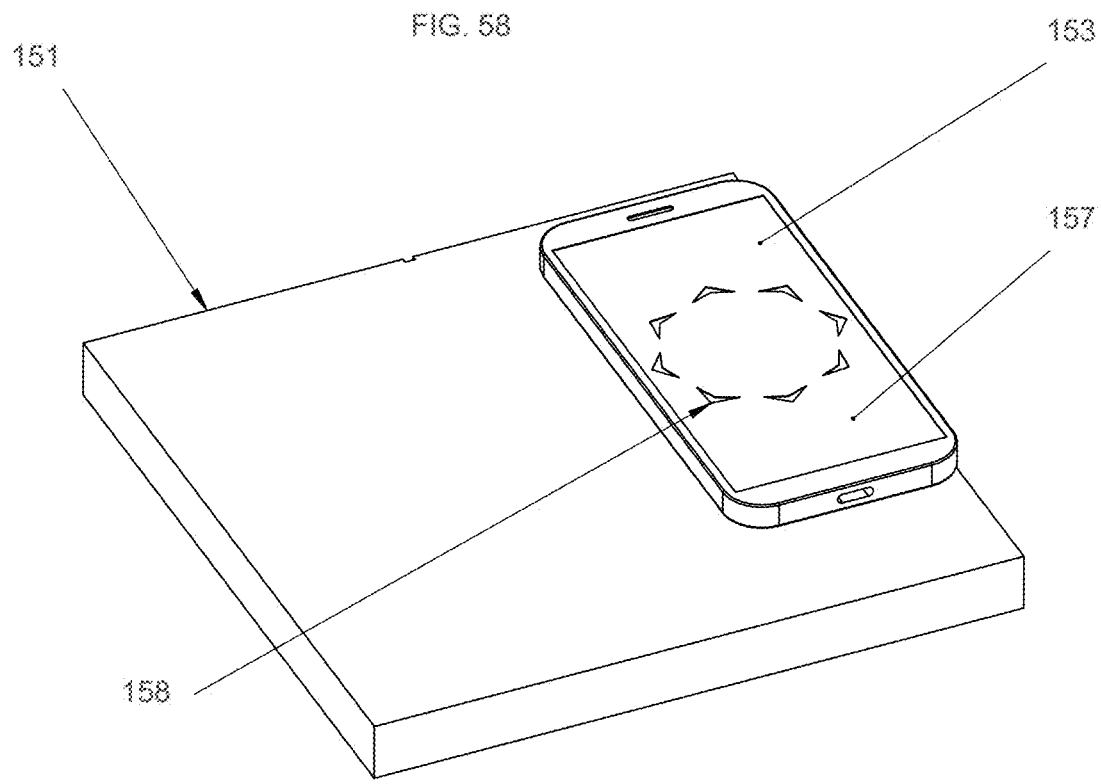
FIG. 59 shows a perspective view of a charging system that is performing charging through a furniture panel with details of the charging displayed on the energy receiver, according to an embodiment of the present disclosure.
Figure 60:
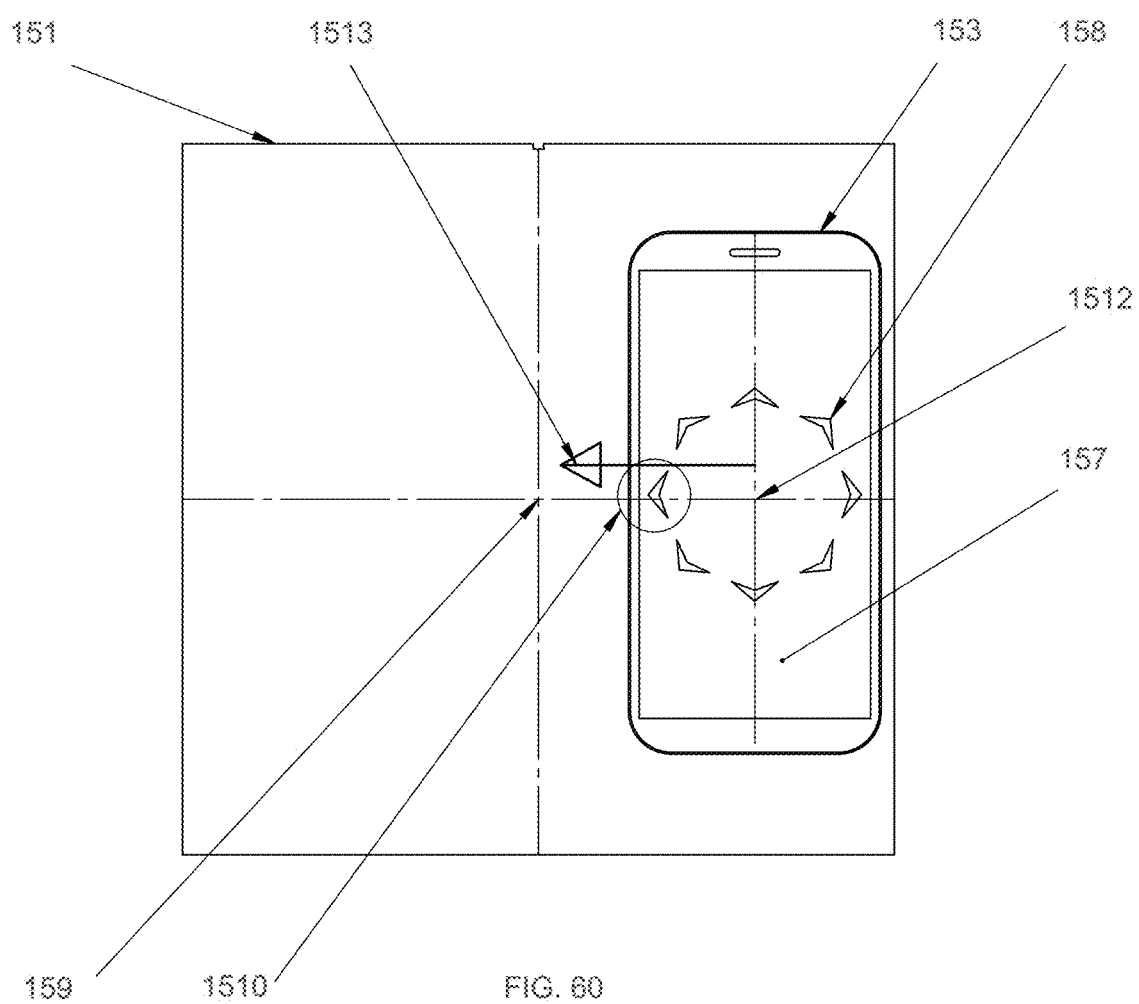
FIG. 60 shows a view illustrating a function of a positioning system, according to an embodiment of the present disclosure.

FIG. 56 shows a perspective view of a charging system through a furniture panel that is non-transparent to visible and infrared light, according to an embodiment of the present disclosure. FIG. 57 shows an exploded perspective view of a charging system with a charging module, according to an embodiment of the present disclosure. FIG. 58 shows an exploded perspective view of a loading system with a loading module shown, according to an embodiment of the present disclosure. FIG. 59 shows a perspective view of a charging system that is performing charging through a furniture panel with details of the charging displayed on the energy receiver, according to an embodiment of the present disclosure. FIG. 60 shows a view illustrating a function of a positioning system, according to an embodiment of the present disclosure.

Referring to FIGS. 56-60, a charging system may include of a furniture board 151 (e.g., a non-transparent, wooden, and/or solid board) that provides a charging and mounting location for the charging module 152 (e.g., a portable wireless communication device). The charging module 152 may be mounted (e.g., positioned) on the bottom of the board 1 and equipped with an energy transmitter 154 (e.g., an induction coil for transmitting wireless power) and a matrix 156 of position sensors 155. The position sensors 155 may be arranged in a predetermined pattern such that each position sensor 155 is spaced apart from each other position sensor 155 by a specified distance. In response to the board 151 not being transparent, the applied position sensors 155 operate according to capacitive signals, radio signals or other principle signals which permit transmission through a non-transparent board material (e.g., wood).

The wireless energy transmitter and wireless energy receiver most efficiently operate when placed at an ideal orientation at a center 159 of the transmitter (e.g., the board 151) and a center 1512 of the receiving device 153. The correct arrangement of the above-mentioned system elements is possible thanks to the installation of an internal smartphone application 157 in the receiving device 153, which will enable a display on the receiving device 153 to display suggestions (e.g., direction arrows that suggest a movement and/or point towards the center 159) 158 of the movement 1513 in relation to the board 151.

The display of the receiving device 153 may display a position correction icon 1510 (e.g., a direction arrow that is illuminated or highlighted) when an energy receiver included in the device 153 is positioned within a predetermined distance along the surface of the board 151 in relation to the transmitter 154. For example, if the device 153 moves 1513 in a direction towards the center 159 of the board 151, and a horizontal distance from the transmitter 154 to the device 153 is less than a predetermined number (e.g., 5 centimeters), then the device 153 may display the position correction icon 1510 indicating a direction towards the center 159. Accordingly, the application 157 may notify the user of the correct positioning of the transmitter means with respect to the power receiver. Additionally or alternatively, the application 157 may provide an audible notification.

FIGS. 61-65 are directed to a structure and operation of a charging system that performs charging through a transparent furniture panel. For example, the transparent furniture panel may allow visible light and/or infrared radiation to visibly pass through a surface thereof.

Figure 61:
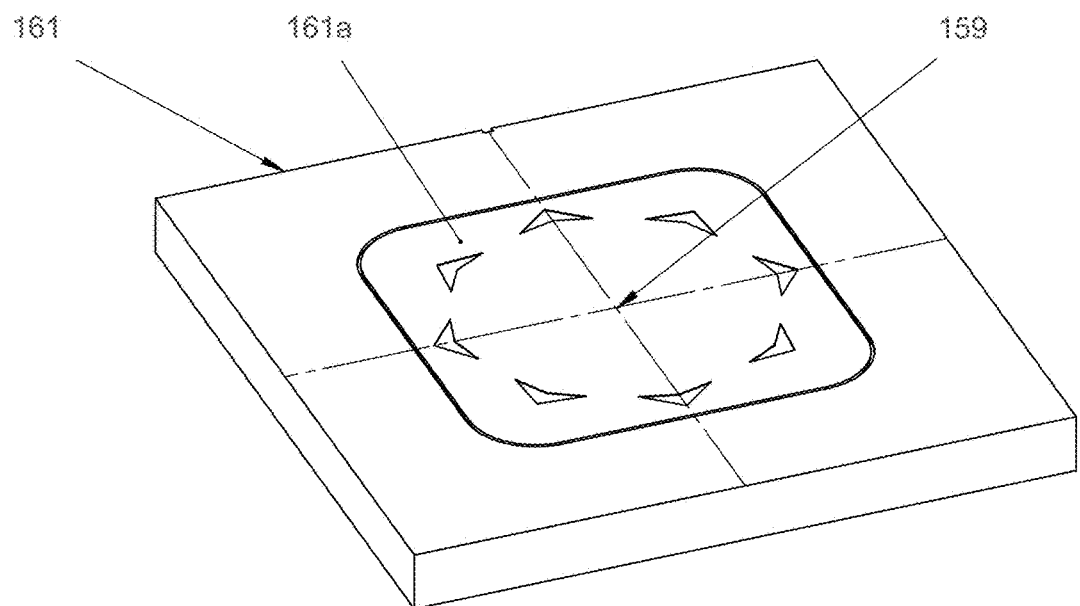
FIG. 61 shows a perspective view of a charging system performing charging through a furniture panel and a transparent decorative element, according to an embodiment of the present disclosure.
Figure 62:
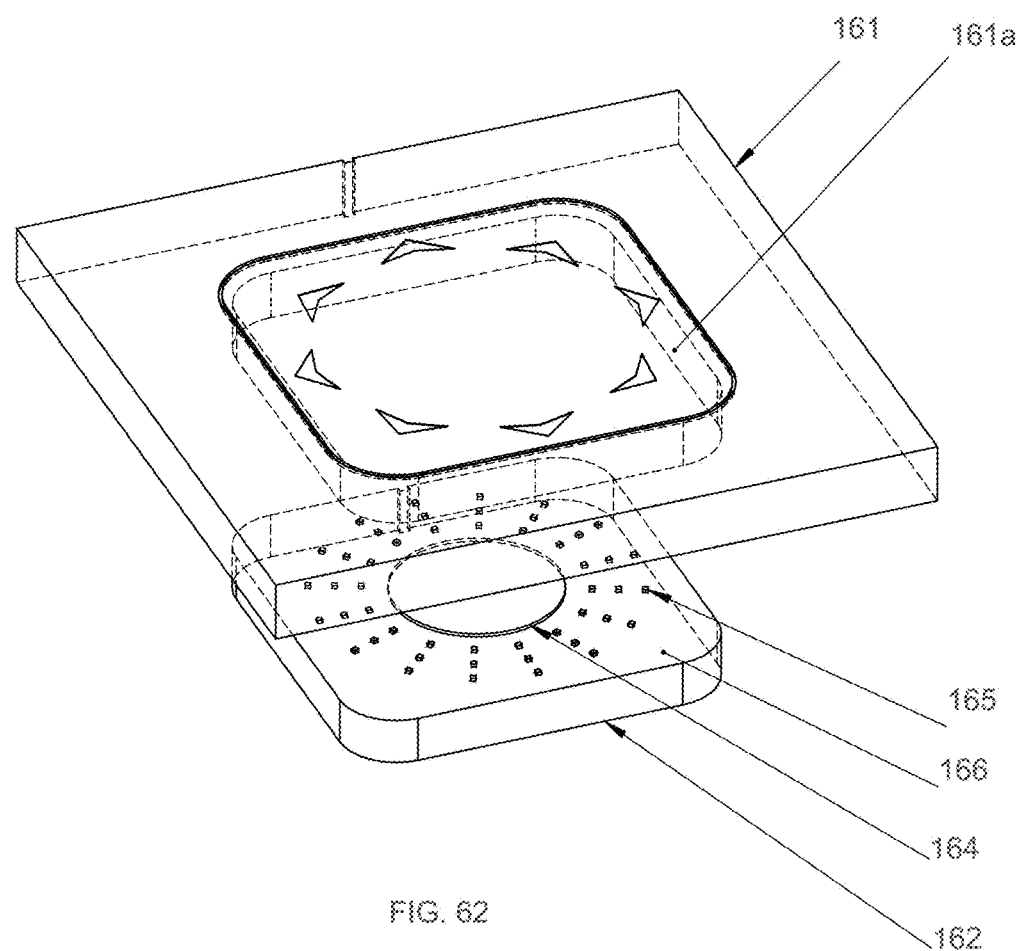
FIG. 62 shows an exploded perspective view of a charging system with a charging module, according to an embodiment of the present disclosure.
Figure 63:
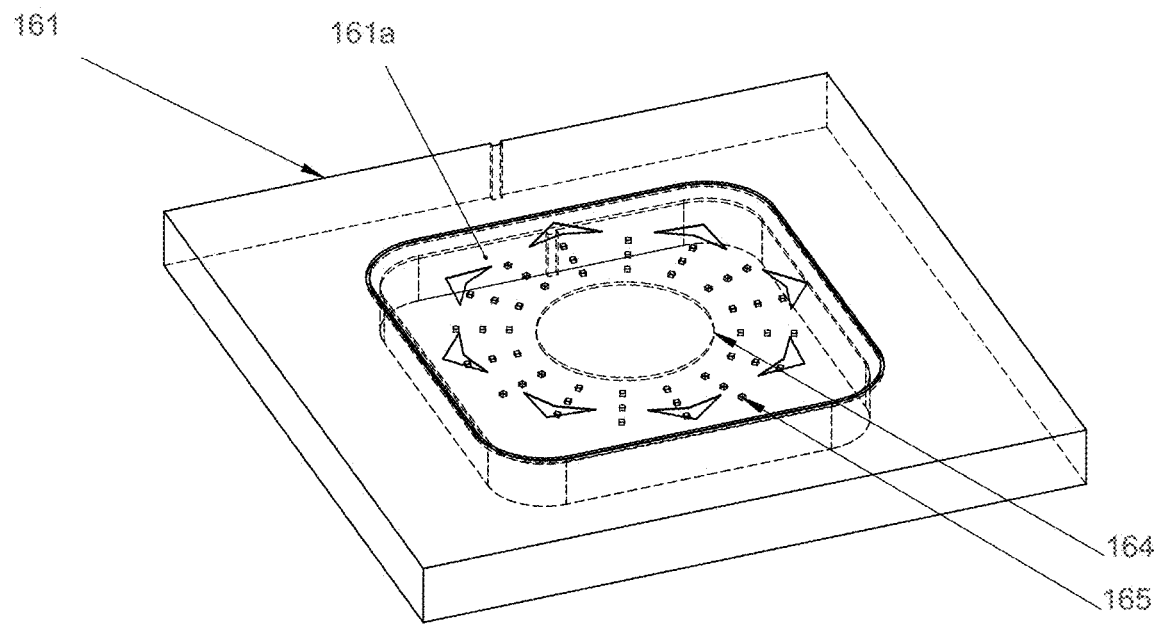
FIG. 63 shows an exploded perspective view of a loading system with a loading module shown, according to an embodiment of the present disclosure.
Figure 64:
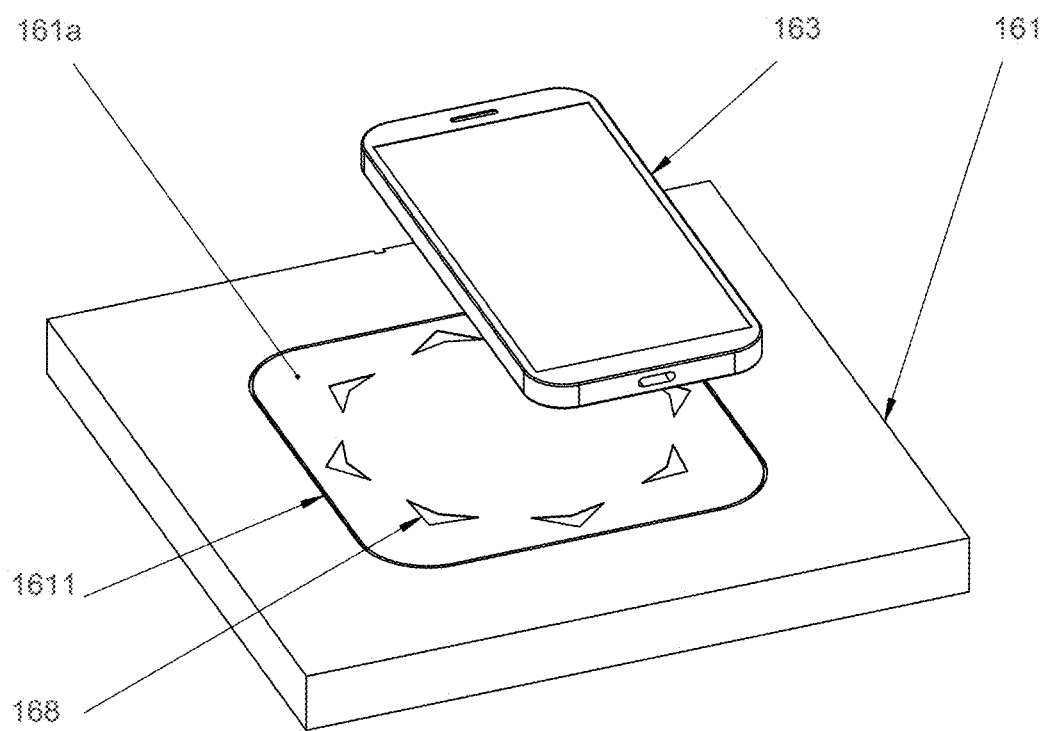
FIG. 64 shows a perspective view of a charging system performing charging through a furniture panel and a transparent decorative element, according to an embodiment of the present disclosure.
Figure 65:
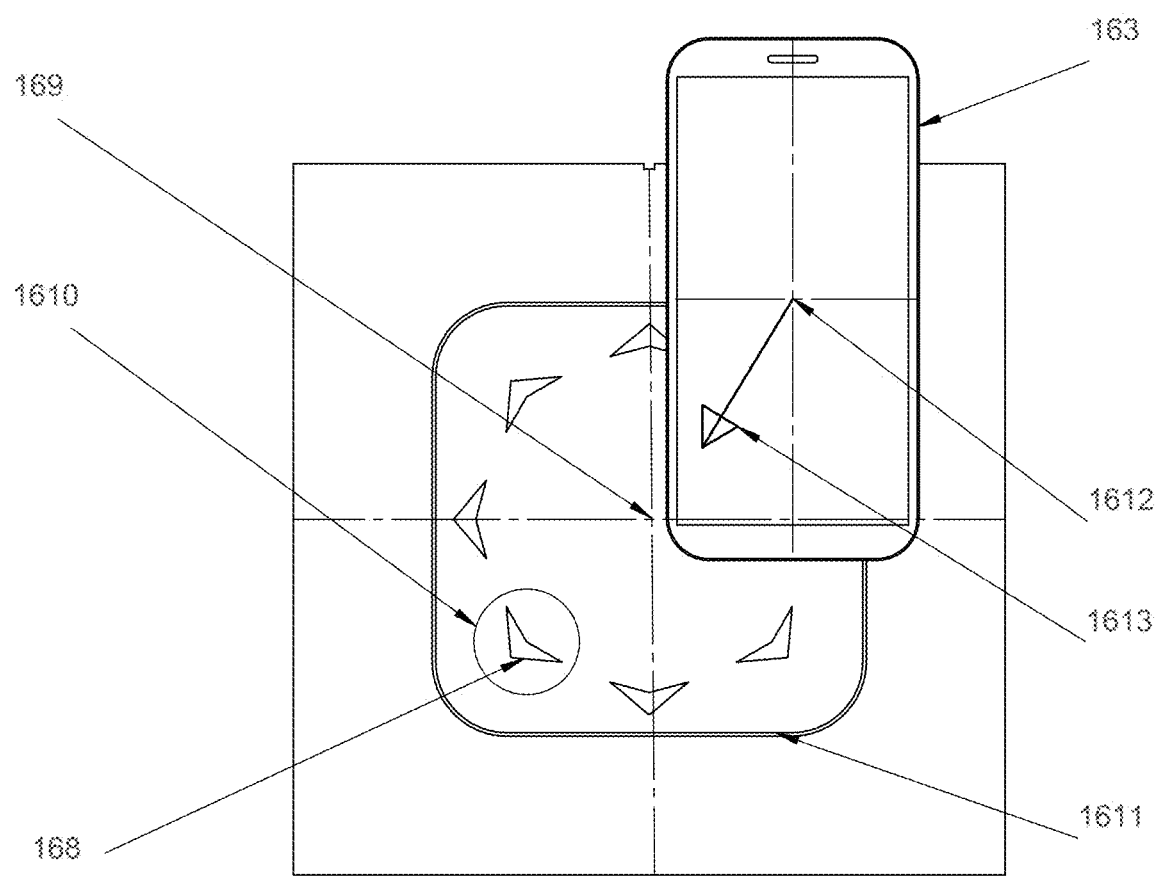
FIG. 65 shows a view illustrating a function of a positioning system, according to an embodiment of the present disclosure.

FIG. 61 shows a perspective view of a charging system performing charging through a furniture panel and a transparent decorative element, according to an embodiment of the present disclosure. FIG. 62 shows an exploded perspective view of a charging system with a charging module, according to an embodiment of the present disclosure. FIG. 63 shows an exploded perspective view of a loading system with a loading module shown, according to an embodiment of the present disclosure. FIG. 64 shows a perspective view of a charging system performing charging through a furniture panel and a transparent decorative element, according to an embodiment of the present disclosure. FIG. 65 shows a view illustrating a function of a positioning system, according to an embodiment of the present disclosure.

Referring to FIGS. 61-65, a charging system may include of a furniture board 161 (e.g., a non-transparent, wooden, and/or solid board) that provides a charging and mounting location for the charging module 162 (e.g., a portable wireless communication device). In addition, the board 161 may include an additional central flat element 161*a* that is transparent and may allow visible light and/or infrared radiation to visibly pass through a surface thereof. In other words, the furniture board 161 may not be transparent (e.g., the furniture board 161 may be made of wood), and the central flat element 161*a* may be transparent (e.g., the central flat element 161*a* may be made of a clear plastic material). The charging module 162 may be mounted (e.g., positioned) on the bottom of the board 1 and/or flat element 161*a* and equipped with an energy transmitter 164 (e.g., an induction coil for transmitting wireless power) and a matrix 166 of position sensors 165. The position sensors 165 may be arranged in a predetermined pattern such that each position sensor 165 is spaced apart from each other position sensor 165 by a specified distance. In response to the board 161 and/or flat element 161*a* being transparent, visible light, infrared radiation, or other wireless transmission signals may be transmitted through the board 161. That is, the board 161 and/or flat element 161*a* may include a transparent surface and display information through the transparent surface.

The wireless energy transmitter and wireless energy receiver most efficiently operate when placed at an ideal orientation at a center 169 of the transmitter (e.g., the board 161) and a center 1612 of the receiving device 163. The correct arrangement of the above-mentioned system elements is possible without necessarily installing a smai tphone application in the receiving device 163. Rather, a display may be included in the board 161 and/or flat element 161*a* to display suggestions (e.g., direction arrows that suggest a movement and/or point towards the center 169) 168 of the movement 1613 in relation to the board 161.

The display of the board 161 and/or flat element 161*a* may display a position correction icon 1610 (e.g., a direction arrow that is illuminated or highlighted) when an energy receiver included in the device 163 is positioned within a predetermined distance along the surface of the board 161 in relation to the transmitter 164. For example, if the device 163 moves 1613 in a direction towards the center 169 of the board 161, and a horizontal distance from the transmitter 164 to the device 163 is less than a predetermined number (e.g., 5 centimeters), then the board 161 and/or flat element 161*a* may display the position correction icon 1610 indicating a direction towards the center 169. Additionally or alternatively, the board 161 and/or flat element 161*a* may project light signals from a light ring 1611 on the surface of the board 161 and/or flat element 161*a*.

While the disclosure has been shown and described with reference to a certain preferred embodiment thereof, it will be understood by those skilled in the art that various changes in form and details may be made therein without departing from the spirit and scope of the disclosure.

The invention claimed is:

1. A charger shelf for wireless charging a portable electronic device located thereon, the charger shelf comprising:
a shelf mounted on a holder and configured to move in a direction of at least one of an X, Y or Z axis from a rest position to an optimal charging positional using an internal drive unit mounted in the shelf, and
a charging module connected to an electrical power source and positioned inside the shelf and equipped with at least one coil supplying power to the portable electronic device, the charging module determining an area configured to charge the portable electronic device,
wherein the charger shelf is configured to rotate around the x axis by an angle $\alpha$, rotate around the y axis by an angle $\beta$, or rotate around the z axis by an angle $\gamma$.

2. The charger shelf of claim 1, further comprising:
a first guide rail positioned inside the charger shelf, and
a second guide rail positioned inside the charger shelf,
wherein the first guide rail is perpendicular to the second guide rail,
wherein the charger shelf is configured to search for a position of the portable electronic device located thereon, and upon detecting the position of the portable electronic device using locator matching, the charger shelf is configured to move the at least one coil to the position of the portable electronic device along at least one of the first guide rail or the second guide rail.

3. The charger shelf of claim 1, wherein the shelf is configured to be vertically raised or lowered using a hinged pivot member embedded in the holder.

4. The charger shelf of claim 1, wherein the shelf is configured to be vertically raised or lowered using an attachment member in the holder.

5. The charger shelf of claim 1, wherein the shelf is configured to be rotatable around a vertical axis by a predetermined angle using a swivel mount.

6. The charger shelf of claim 1, wherein the shelf is configured to be movable using an articulating handle.

7. The charger shelf of claim 1, wherein the shelf is extendable and slidable as a drawer using a guide holder.

8. The charger shelf of claim 1, wherein the shelf includes a clamp for mounting the portable electronic device to the area to charge the portable electronic device.

9. The charger shelf of claim 1, wherein the shelf is magnetically mounted to a mounting area using a magnetic holder.

10. The charger shelf of claim 1, wherein the charging module is powered by a solar cell.

11. The charger shelf of claim 1, wherein the shelf is provided with a lighting illumination and a motion sensor activating the lighting.

12. The charger shelf of claim 1, wherein the portable electronic device to be charged is a smartphone, a smartwatch, or a computer.

13. The charger shelf of claim 1, wherein the shelf is a display monitor.

14. The charger shelf of claim 1, wherein the portable electronic device to be charged is a device having a receiver that receives a current from the coil and supplies the current to the portable electronic device.

15. A charger shelf for wireless charging a portable electronic device located thereon, the charger shelf comprising:
a shelf mounted on a holder and configured to move in a direction of at least one of an X, Y or Z axis from a rest position to an optimal charging positional using an internal drive unit mounted in the shelf,
a charging module connected to an electrical power source and positioned inside the shelf and equipped with at least one coil supplying power to the portable electronic device, the charging module determining an area configured to charge the portable electronic device, and
a position sensor matrix configured to recognize a position of the external electronic device on a surface of the charger shelf based on modulation of current drawn by the portable electronic device,
  wherein the panel device is configured to visually display or audibly indicate at least one direction for identifying an optimal charging position for charging the portable electronic device based on the recognized position.

16. The charger shelf of claim 15, wherein the surface of the charger shelf is transparent and includes a display screen configured to display the at least one direction.

17. The charger shelf of claim 15, wherein the surface of the charger shelf is not transparent,
  wherein the position sensor matrix comprises sensors for transmitting capacitive, radio, or other non-visible radiation through the surface, and
  wherein the portable electronic device is configured to display the at least one direction.

18. The charger shelf of claim 1, wherein visible light, infrared radiation, radio waves, sound waves, or electromagnetic induction are used to wirelessly charge the portable electronic device.

19. A charger shelf for wireless charging a portable electronic device located thereon, the charger shelf comprising:
  a shelf mounted on a holder and configured to move in a direction of at least one of an X, Y or Z axis from a rest position to an optimal charging positional using a first motor mounted in the shelf,
  a charging module connected to an electrical power source and positioned inside the shelf and equipped with a second motor and at least one coil supplying power to the portable electronic device, the charging module determining an area configured to charge the portable electronic device; and
  a position sensor matrix configured to recognize a position of the external electronic device on a surface of the charger shelf based on modulation of current drawn by the portable electronic device,
  wherein the charger shelf is configured to visually display or audibly indicate at least one direction for identifying an optimal charging position for charging the portable electronic device based on the recognized position, and
  wherein the charging module is configured to move from a first position to a second position using the second motor.

* * * * *